(12) United States Patent
Fischmann

(10) Patent No.: US 11,978,006 B2
(45) Date of Patent: May 7, 2024

(54) LOW CAPITAL AND OPERATIONAL COST E-COMMERCE LOGISTICS SYSTEM FOR FAST AND MASSIVE DELIVERY OF E-COMMERCE MERCHANDISE TO LARGE GEOGRAPHICAL AREAS

(71) Applicant: Parachute Logistics, LLC, Coral Gables, FL (US)

(72) Inventor: Fernando Benjamin Fischmann, Coral Gables, FL (US)

(73) Assignee: PARACHUTE LOGISTICS, LLC, Coral Gables, FL (US)

( * ) Notice: Subject to any disclaimer, the term of this patent is extended or adjusted under 35 U.S.C. 154(b) by 0 days.

(21) Appl. No.: 17/466,890

(22) Filed: Sep. 3, 2021

(65) Prior Publication Data

US 2022/0076201 A1 Mar. 10, 2022

Related U.S. Application Data

(60) Provisional application No. 63/222,497, filed on Jul. 16, 2021, provisional application No. 63/116,439, (Continued)

(51) Int. Cl.
*G06Q 10/0832* (2023.01)
*B64C 39/02* (2023.01)
(Continued)

(52) U.S. Cl.
CPC ........... *G06Q 10/0832* (2013.01); *B64D 1/12* (2013.01); *B64D 1/14* (2013.01); *B64D 9/00* (2013.01);
(Continued)

(58) Field of Classification Search
CPC ... B64D 1/12; B64D 1/14; B64D 9/00; G06Q 10/08; G06Q 10/087; G06Q 10/0832;
(Continued)

(56) References Cited

U.S. PATENT DOCUMENTS 9,305,280 B1 4/2016 Berg et al.
9,969,494 B1 5/2018 Buchmueller et al.
(Continued)

FOREIGN PATENT DOCUMENTS

KR 10-2018-0008359 A 1/2018
WO 2016/168952 A1 10/2016

OTHER PUBLICATIONS

International Search Report and Written Opinion for Application No. PCT/US2021/049147 dated Feb. 15, 2022.
(Continued)

*Primary Examiner* — Peter Ludwig
*Assistant Examiner* — Avia Salman
(74) *Attorney, Agent, or Firm* — MERCHANT & GOULD P.C.

(57) ABSTRACT

The present invention discloses a disruptive low capital and operational cost logistics system and method that provides for fast and massive delivery of e-commerce merchandise, including same day delivery, of thousands of items and packages, in extensive geographical areas, such as whole states, countries and continents, reducing the need for building, operating, or using multiple fulfillment warehouses located near the consumers as in traditional e-commerce logistics, creating a revolution in the e-commerce industry worldwide.

In a disruptive manner, the systems and methods of the present invention facilitate the logistics for e-commerce delivery processes, and also may allow at the same time reducing the use of massive quantities of cardboard packages that are used for protection and containment for e-commerce orders, being sustainably beneficial for the e-commerce market, the environment, and the consumer. This is achieved by the use of multibox packages that are configured to contain a set of products including orders from
(Continued)

different consumers and not necessarily having individual packages for individual consumers, where such multibox packages are sorted at the origin in a Central Fulfillment Center.

53 Claims, 13 Drawing Sheets

Related U.S. Application Data filed on Nov. 20, 2020, provisional application No. 63/074,842, filed on Sep. 4, 2020.

(51) Int. Cl.
| | |
|---|---|
| *B64D 1/12* | (2006.01) |
| *B64D 1/14* | (2006.01) |
| *B64D 9/00* | (2006.01) |
| *B64F 1/32* | (2006.01) |
| *B64U 101/60* | (2023.01) |
| *B65D 21/02* | (2006.01) |
| *G05D 1/00* | (2006.01) |
| *G05D 1/10* | (2006.01) |
| *G06F 17/11* | (2006.01) |
| *G06Q 10/0631* | (2023.01) |
| *G06Q 10/08* | (2023.01) |
| *G06Q 10/0835* | (2023.01) |
| *G06Q 10/087* | (2023.01) |
| *G06Q 30/0601* | (2023.01) |
| *G06Q 50/28* | (2012.01) |
| *G06Q 50/30* | (2012.01) |

(52) U.S. Cl.
CPC ............. *B64F 1/32* (2013.01); *B64F 1/322* (2020.01); *B65D 21/0213* (2013.01); *G05D 1/0094* (2013.01); *G05D 1/105* (2013.01); *G06F 17/11* (2013.01); *G06Q 10/06315* (2013.01); *G06Q 10/08* (2013.01); *G06Q 10/08355* (2013.01); *G06Q 10/087* (2013.01); *G06Q 30/0635* (2013.01); *G06Q 50/28* (2013.01); *B64C 39/024* (2013.01); *B64U 2101/60* (2023.01); *B64U 2201/10* (2023.01); *G05B 2219/50391* (2013.01); *G06Q 50/30* (2013.01)

(58) Field of Classification Search
CPC ....... G06Q 10/06315; G06Q 10/08355; G06Q 30/0635; G06Q 50/28; G06Q 50/30; G06Q 10/043; G06Q 10/0834; G06Q 20/3278; G06Q 20/3274; B64F 1/32; B64F 1/322; B65D 21/0213; G05D 1/0094; G05D 1/105; G06F 17/11; G06F 19/323; G06F 2212/178; B64C 39/024; B64C 2201/128; B64C 2201/141; G05B 2219/50391; G05B 2219/31197; B64U 2101/60; B64U 2201/10; B64U 2101/64; G06K 7/10237; G06K 7/10247; H04W 4/008; H04W 4/80; H04W 12/00407; B60R 2325/103; G03G 21/1657; G07G 1/0045; G07G 1/009; G09F 3/0335; G16H 10/65; H01H 2300/032; H04M 2250/04; H04Q 1/138; H04Q 2209/47

See application file for complete search history.

(56) References Cited

U.S. PATENT DOCUMENTS

| | | |
|---|---|---|
| 10,131,437 B1 | 11/2018 | Hanlon |
| 10,308,430 B1 | 6/2019 | Brady et al. |
| 10,373,097 B2 | 8/2019 | Kulkarni et al. |
| 10,710,715 B2 | 7/2020 | Yates |
| 10,796,275 B1 | 10/2020 | Wilkins |
| 2015/0379459 A1* | 12/2015 | Russell ............. G06Q 10/0875 235/380 |
| 2018/0342007 A1* | 11/2018 | Brannigan ......... G06Q 30/0643 |
| 2019/0034877 A1 | 1/2019 | Cantrell et al. |
| 2019/0180237 A1 | 6/2019 | Mattingly et al. |
| 2019/0233103 A1 | 8/2019 | High et al. |
| 2020/0231302 A1* | 7/2020 | Turner ..................... B64D 1/12 |
| 2021/0107649 A1* | 4/2021 | Simpson ................. B64D 1/12 |

OTHER PUBLICATIONS

U.S. Appl. No. 17/466,822, filed Sep. 3, 2021, 2022/0076367 A1, Mar. 10, 2022.
U.S. Appl. No. 17/466,934, filed Sep. 3, 2021, 2022/0076202 A1, Mar. 10, 2022.
U.S. Appl. No. 17/466,957, filed Sep. 3, 2021, 2022/0076368 A1, Mar. 10, 2022.
U.S. Appl. No. 17/466,990, filed Sep. 3, 2021, 2022/0076203 A1, Mar. 10, 2022.
U.S. Appl. No. 17/467,015, filed Sep. 3, 2021, 2022/0076205 A1, Mar. 10, 2022.
U.S. Appl. No. 17/547,353, filed Dec. 10, 2021, 2022/0101472 A1, Mar. 31, 2022.
U.S. Appl. No. 17/547,375, filed Dec. 10, 2021, 2022/0101253 A1, Mar. 31, 2022.
U.S. Appl. No. 17/547,398, filed Dec. 10, 2021, 2022/0101254 A1, Mar. 31, 2022.
Meincke et al., "Concepts for Cargo Ground Handling of Unmanned Cargo Aircrafts and Their Influence on the Supply Chain," 8th International Conference on Logistics, Informatics and Service Sciences (LISS), https://ieeexplore.ieee.org/document/8593214, 12 pages (Aug. 6, 2018).
Shivakumar, "Giant cargo drones will deliver packagesfarther and faster," The Verge, https://www.theverge.com/2019/6/10/18657150/autonomous-cargo-drones-delivery-boeing-aircraft-faa-regulation, 2 pages (Jun. 10, 2019).

* cited by examiner

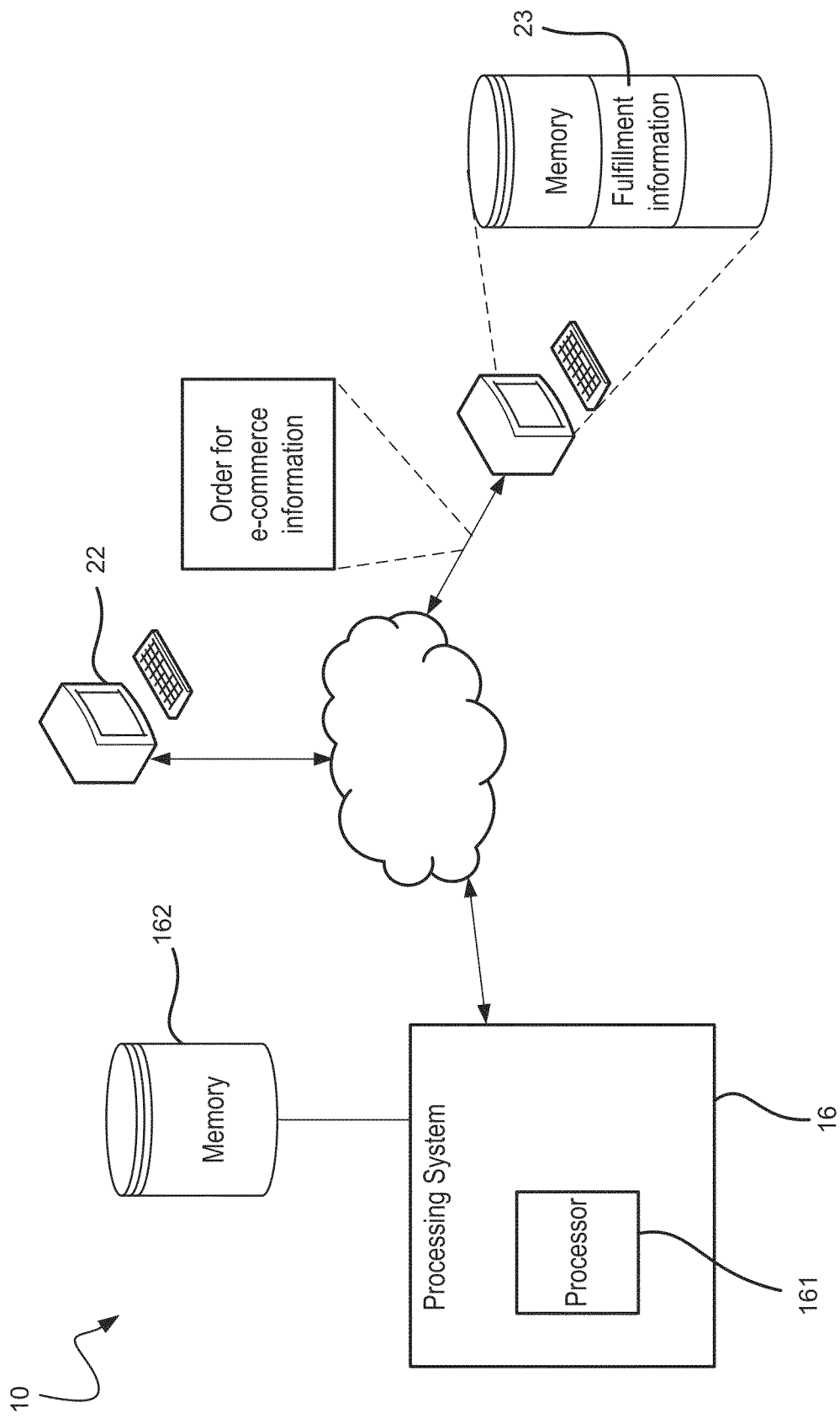

LOW CAPITAL AND OPERATIONAL COST E-COMMERCE LOGISTICS SYSTEM FOR FAST AND MASSIVE DELIVERY OF E-COMMERCE MERCHANDISE TO LARGE GEOGRAPHICAL AREAS

The present invention discloses a disruptive low capital and operational cost logistics system and method that provides for fast and massive delivery of e-commerce merchandise, including same day delivery, of thousands of items and packages, in extensive geographical areas, such as whole states, countries and continents, reducing the need for building, operating, or using multiple fulfillment warehouses located near the consumers as in traditional e-commerce logistics, creating a revolution in the e-commerce industry worldwide.

In a disruptive manner, the systems and methods of the present invention facilitate the logistics for e-commerce delivery processes, and also may allow at the same time reducing the use of massive quantities of cardboard packages that are used for protection and containment for e-commerce orders, being sustainably beneficial for the e-commerce market, the environment, and the consumer. This is achieved by the use of multibox packages that are configured to contain a set of products including orders from different consumers and not necessarily having individual packages for individual consumers, where such multibox packages are sorted at the origin in a Central Fulfillment Center.

FIELD OF THE INVENTION

The present invention relates to e-commerce logistics systems and methods, comprising first mile logistics, including parcel delivery methods and systems.

Traditional large-scale e-commerce logistic systems and methods, generally store the merchandise in multiple fulfillment centers near consumers to provide fast delivery from such fulfillment centers. The need for building, operating, or using multiple warehouses makes the distribution of e-commerce products more expensive, and creates an insurmountable barrier for competitors in the e-commerce market.

The present invention, instead, allows for the storage of the merchandise in one or a small number of Central Fulfillment Centers (CFCs), and then sends the merchandise in air-cargos (containing individual or multibox packages) that contain the products of different orders or clients that must be delivered within the same pre-defined area. Such air-cargos are dropped from a manned aircraft during flight into drop zones strategically localized near the consumers without the need to land in such drop zone. The present invention's systems and methods also include the use of at least one of a landing assisting system or a path guidance system. In a preferred embodiment, the present invention's systems and method include the use of a landing assisting system comprising a net receiving system. After the air-cargos are retrieved from the drop zone, the merchandise is then delivered to the consumer, and in a preferred embodiment, the e-commerce merchandise is delivered to the consumer through the use of last mile delivery systems such as ride share systems.

The method and system of the invention allow a fast delivery, even in a few hours, of thousands of e-commerce products, including fresh products, reducing the need for building, operating, or using multiple and expensive warehouses with expansive footprints that have high capital and operating costs.

BACKGROUND OF THE INVENTION

The e-commerce market has experienced a steady growth over the past years, with revenues surpassing 340 billion dollars in the U.S. only. E-commerce refers to selling and buying products and/or services over the internet (online), encompassing a large variety of products ranging from clothes, electronics, and supplies, to fresh and novelty products, among others. Today practically everything can be purchased online. As shown in FIG. 1, the increase of e-commerce revenues has grown exponentially over the past years, and it is expected to keep growing even more for the following years given the increase of use of online shopping and online platforms by consumers.

AMAZON® is one of the companies that provides not only an online selling platform between business and consumers, or even business to business, but also provides the logistics and fulfillment network to deliver the product to the buyer in short time. Amazon has been leading the e-commerce market over the last several years given their large network of facilities and delivery logistics, as well as its online platform that allows to provide a selection of over 350+ million products. From information and belief, the main strategy and competitive advantage of Amazon that has allowed it to dominate the market and greatly surpass other vendors (which to date there does not appear to be any having similar large scale logistics), has been to construct, operate, and use a large number of fulfillment centers in the U.S. and Europe. These fulfillment centers house the e-commerce merchandise and are located near the consumers, which provides an opportunity to deliver the merchandise to customers faster—for example, by delivering millions of products to customers within one or two days and, only a minor percentage of such products on the same day. This has created a high-capital and high-operation cost barrier to entry such fast-delivery e-commerce market that is virtually insurmountable by other vendors.

As shown in FIG. 2, Amazon has grown exponentially, leaving behind potential competitors in the e-commerce business in the U.S. and even worldwide, such as EBAY®, ETSY®, or ALIBABA®, which have different logistics systems.

In the U.S., for example, Amazon offers a fulfillment system to vendors (referred to as "Fulfillment by Amazon" or "FBA"), which allows the vendor to ship product inventory to Amazon, who takes care of coordinating all the delivery logistics to achieve a short delivery time to the consumer. From information and belief, to achieve this delivery logistics, Amazon has a system where the vendor ships its products to an Amazon warehouse or inbound cross doc center. Such inbound cross doc centers are in charge of receiving the merchandise from vendors, and then sorts the products and ships them to different fulfillment centers located all over the country near the consumers, with Amazon having more than 180 fulfillment centers in the U.S. (with many more coming). The products are distributed to different fulfillment centers, requiring multiple quantities stored of the same item in many different locations. Then, when a consumer puts an online order for such product to arrive in a short period of time, the logistic and delivery software determines the fulfillment center that has the product and that is nearest or that can ship the product faster to the consumer, where afterward the product is generally sent to an outbound sorting center near the cities or the consumers, and then to the end consumer through a combination of Amazon's freight system and others (such as UPS, FedEx, or USPS, among others). This final delivery step to the end consumer is often referred to as "last mile delivery". This can be seen in FIG. 3 and FIG. 4 as simplified schematics showing Amazon's fulfillment system. Such simplified schematics for Amazon's fulfillment are applicable for each one of its numerous fulfillment centers.

Amazon has been rapidly increasing its numbers of fulfillment centers in the U.S. and Europe, investing in de-centralized warehouses in order to establish one or two day deliveries as their standard. As seen in FIG. 5, a schematic map illustrates the approximate current locations of Amazon fulfillment centers in the U.S., having more than 180 fulfillment and supplemental centers already built and over 200 fulfillment centers, supplemental centers, delivery stations, and sortation centers in planning. This very large number of fulfillment centers located throughout the U.S. in a de-centralized manner (near the consumers) allows Amazon to have a virtually unbeatable competitive advantage over other online retailers, which is to provide a two-day delivery or even same day delivery for some of its products. No other company currently can provide this short time same day delivery schedule for so many products and variety (currently estimated as more than 1 million items in some cities).

As a reference, Amazon's fulfillment centers have very large footprints which currently add up to more than 133 million square feet (1,235 hectares). This amount of square footage could easily cover a large portion of Manhattan in the City of New York, as seen in FIG. 6. Even with this current huge fulfillment-center infrastructure, only a minor percentage of products can be delivered on the same day in a few cities. For example, free one-day delivery only covers about 10 million products (from Amazon's 350+ million catalogue), and same day delivery has a catalogue of up to 3 million products only in few selected areas (about 1% of its total catalogue).

Further, today Amazon and grocery stores deliver fresh products with a different distribution system, not through its large fulfillment centers, but from stores located in the cities near the consumer, such as WHOLEFOODS® (which was purchased by Amazon).

This huge network of facilities, which allows fast shipping and delivery of many different types of products, has allowed Amazon to be the dominant online store today, having 45% of the e-commerce market in the U.S. alone. Even though Amazon did not start as a retail company, it has become a juggernaut in the e-commerce market, mainly given by the huge amount of facilities and fulfillment centers that create the infrastructure for locating products close to population centers, thereby enabling fast shipments to consumers.

It is also important to mention that while Amazon is one of the leading companies in the e-commerce business and has an important advantage in terms of delivery times, from public information it has been estimated that its annual costs are distributed so that about 50% of its costs come from the actual delivery costs of the e-commerce merchandise, and the other 50% relates to the cost of running and maintaining the large fulfillment center network to achieve short time-frame deliveries. This means that Amazon spends almost the same to deliver the packages as to maintain the fulfillment structure to achieve these deliveries.

Some studies suggest that many consumers would utilize the same vendor or other e-commerce providers based on if they were able to ship products faster. Reducing the timing to receive a purchased e-commerce order has become the main goal of all companies that sell through e-commerce, focused on the need of the customer to receive the product they purchased as soon as possible. Further, although some companies are trying to compete with leading companies, there have been no significant innovations that avoid the need of having to build and operate high-capital and operation cost and high-footprint de-centralized Fulfillment Centers infrastructure to make this happen.

The market trend of e-commerce has been evolving from deferred delivery (3-5 days), to next-day delivery, and now to the current intended trend of same day delivery, in hours. Amazon is dominating this trend offering same day delivery in few cities of the U.S. and Europe generally with over 1 million in population, where Amazon has de-centralized Fulfillment Centers and infrastructure near the consumers. However, other companies around the world are also starting to dominate the market of their regions by also having a large fulfillment center network.

Therefore, there is a need in the market for alternative low-cost distribution and logistics methods and systems that overcome the high-capital and operation cost, large scale, de-centralized distribution center model that is focused on the first miles logistics to bring the e-commerce merchandise as close to the consumer as possible, previous to the last mile delivery. Alternatives to this de-centralized system would need to overcome the high-capital and operation costs associated with having to build, operate, and use a large number of fulfillment centers, as well as stocking each of such multiple fulfillment centers with the same goods and products to achieve fast delivery in its direct surroundings. Such alternatives need to provide for fast delivery times to consumers, preferably same day delivery schedules, and even in a few hours in all locations, including isolated locations.

All of this results in the necessity of having alternative low-cost logistics systems and methods that can allow entering and/or growing within the e-commerce market without requiring making large investments in infrastructure and operation to construct, operate, and/or use numerous fulfillment centers, allowing to provide same or faster delivery at lower costs. This poses the following questions: What if there was an alternative to current e-commerce giants' logistics systems and methods? What if there were other companies and alternatives that can provide deliveries as fast as current de-centralized systems or even faster, in just hours, potentially at lower costs for the consumer? What if these fast deliveries could be done in isolated places around the world? What if these logistics systems and methods could cost only a fraction in terms of capital and operation costs compared to de-centralized models? What if the systems could facilitate speedy delivery from smaller retailers, even in isolated places? What if the price of fulfillment for e-commerce goods is reduced for vendors and/or consumers? What about if the vendors would need to store their products in just one or few warehouses instead of more than a hundred? What about if the carbon footprint for the distribution of multiple products from vendors to outbound sorting centers and to warehouses could be lowered? What about if all the e-commerce products could be delivered in the same day in any location, including small towns and rural areas as well as high-population density urban areas? What if there are alternatives and sustainable solutions that allow minimizing the use of cardboard boxes for shipping and delivering e-commerce products? What if there is no need for individual cardboard boxes for shipment of the e-commerce products? What about if a huge assortment of fresh products could be delivered on the same day and not only the ones available on the nearby supermarket?

SUMMARY

The present invention provides innovative low capital and operation cost logistics systems and methods related to the first miles logistics for delivery of e-commerce merchandise, which generate an alternative to current de-centralized fulfillment center models. The present invention provides for fast delivery of e-commerce merchandise from a small number of Central Fulfillment Centers or fulfillment center space, and can be used by large or small retailers, and even vendors or manufacturers, to achieve delivery of their products in short periods of time, without requiring to build, operate, or use a large network of de-centralized fulfillment centers or fulfillment center space, and therefore allowing to have lower capital and/or operation costs for such purpose.

The disruptive low capital and operation cost logistics systems and methods of the invention provide and allow for the fast and massive delivery of e-commerce merchandise, including same-day delivery, of thousands of items and packages, in extensive geographical areas such as entire states, countries, and continents, including isolated areas, reducing the need for building, operating, or using multiple fulfillment centers or warehouses near the consumers, creating a revolution in the e-commerce industry worldwide.

The low capital and operation cost logistics systems and methods from the present invention provide for the storage of the e-commerce merchandise in one or a small number of Central Fulfillment Centers (CFCs), and the shipping of the merchandise in air-cargos (43) comprising individual packages, multibox packages, or combinations thereof, which are loaded into a manned aircraft (5) suitable for air-drop delivery and then air-dropped into drop zones (8) strategically positioned near the consumers, without the need of landing at such drop zone (8). The e-commerce merchandise (21) may be then delivered to the consumer from the drop zone, or as an option it can go through an outbound sorting center before delivery to the consumer.

Additionally, the systems and methods from the present invention allow to sort the products at the origin storage location (CFC) and place products from different orders that are destined to a specific zone (such as a block, neighborhood, small town, small city, and even a same building) in the same package through the use of a multibox package (41), which allows to simplify the e-commerce logistics and minimize the massive use of individual cardboard boxes for individual consumers.

The present invention and its innovative logistics systems and methods allows reducing the need for building, operating, or using multiple high-capital and operation cost warehouses or fulfillment centers with expansive footprints. The need for such a large number of fulfillment centers or fulfillment center space may increase the merchandise price and often creates an insurmountable barrier for competitors in the e-commerce market. The logistics systems and methods of the invention allow for the fast and massive delivery of e-commerce merchandise in an extensive geographical area through air-drop deliveries. The present invention also discloses systems and methods for the fast and massive delivery of e-commerce merchandise to high-population density urban areas.

The advantages and features which characterize the invention are pointed out with particularity in the claims annexed hereto and forming a part hereof. For a better understanding of the invention, however, reference should be made to the drawings that form a part hereof and to the accompanying descriptive matter, in which there is illustrated and described a preferred embodiment of the invention.

The present invention provides a low capital and operation cost e-commerce logistics system that allows for the fast and massive delivery of e-commerce merchandise (21) in an extensive geographical area, reducing the need for building, operating, or using a large number of fulfillment centers located near the consumers as in traditional e-commerce de-centralized logistics, the system comprising:

at least one Central Fulfillment Center (CFC) (2) having a storage area of at least about 5,000 m² and a height of at least two meters between a floor and a top-most roof of the CFC (2), and configured to store at least 10,000 items of e-commerce merchandise (21), wherein the CFC (2) is located at a distance of not 230 more than 50 km from a runway facility for at least one of take-off or landing of a manned aircraft;

a computing system (3) configured to receive fulfillment information (23) for at least 1,000 placed orders per day from at least one of an online shopping platform or a consumer (22); where the computing system (3) is in network connection or in communication with the at least one CFC (2), in order to receive the fulfillment information (23) of the placed orders;

A sorting system (4) that selects the merchandise (21) stored in the at least one CFC (2) and, based on the fulfillment information (23), prepares at least one of a multibox package (41), an individual package (42), or combinations thereof that contain the selected merchandise (21), wherein the prepared packages are then configured or prepared as part of at least one air-cargo (43), which is air-dropped by at least one aircraft (5);

At least one manned air-drop delivery aircraft (5) configured to carry the at least one air-cargo (43), and to carry a total air-cargo load of at least 2,000 kilograms on average and capable of flying at a speed of at least 200 km/h;

At least one air-cargo ejection system (7) located within the aircraft (5), that selectively drops the at least one air-cargo (43) from the aircraft (5) at an altitude of between 5 m and 20,000 m while the aircraft is flying, so that the air-cargo (43) lands on at least one drop zone (8);

At least one drop zone (8) located at a distance of at least 150 kilometers from the at least one CFC (2), wherein the drop zone (8) is configured to receive the at least one air-cargo (43) dropped from the air-drop delivery aircraft (5);

At least one of a landing assisting system (9) or a path guidance system (10), wherein the landing assisting system is configured to reduce the landing speed of the air-cargo and/or providing a softer landing of the at least one air-cargo (43), and wherein the path guidance system is configured to provide guidance to the at least one air-cargo (43); and At least one delivery system (15) arranged to deliver the e-commerce merchandise (21) to consumers from the drop zone (8), wherein the e-commerce 260 merchandise can optionally go through an outbound sorting center (14) before being delivered to the consumer.

The present invention further provides a low capital and operation cost e-commerce logistics method that allows for the fast and massive delivery of e-commerce merchandise (21) in an extensive geographical area, reducing the need for building, operating, or using a large number of fulfillment centers located near the consumers as in traditional e-commerce de-centralized logistics, comprising the following steps:

a) Providing a computing system (3) that receives fulfillment information (23) of an order for e-commerce merchandise (21) placed through at least one of an online shopping platform or a consumer (22), where the computing system (3) is capable of receiving at least 1,000 orders per day and is in network connection or communication with at least one Central Fulfillment Center (CFC) (2) having a storage area of at least about 5,000 m², a height of at least two meters from a floor and a top-most roof of the facility, and that is configured to store at least 10,000 items of e-commerce merchandise (21), wherein the CFC (2) is located at a distance of no more than 50 km from a runway facility for at least one of take-off or landing of a manned aircraft;

b) Selecting, sorting, and preparing, based on the fulfillment information received by the computing system (3), the merchandise (21) as at least one of a multibox package (41), an individual package (42), or combinations thereof, wherein the at least one multibox package (41), individual package (42), or combinations thereof are then configured or prepared as part of at least one air-cargo (43), and loading the at least one air-cargo (43) into a manned air drop delivery aircraft (5) configured to carry a total air-cargo load of at least 2,000 kilograms in average and able to fly at a speed of at least 200 km/s according to the chosen delivery path;

c) Determining, based on the fulfillment information of the e-commerce merchandise within the air-cargo, a drop zone (8) to where the at least one air-cargo (43) should be air-dropped so that the air-cargo (43) lands at such drop zone (8).

d) Providing at least one of a landing assisting system (9) or a path guidance system (10), wherein the landing assisting system is configured to reduce the landing speed of the air-cargo and/or providing a softer landing of the at least one air-cargo (43) within the drop zone (8), and wherein the path guidance system is configured to provide guidance to the at least one air-cargo (43) so that the air-cargo (43) lands within the drop zone (8);

e) Air-dropping at least one air-cargo (43) from the aircraft (5) so that the air-cargo (43) lands within the drop zone (8), wherein the aircraft (5) drops the air-cargo through an ejection system (7) at an altitude of between 5 m and 20,000 m, and at a speed depending on the type of aircraft, environmental or weather conditions, type of landing assisting system (9) or path guidance system (10) used, regulatory requirements, or safety requirements, among others;

f) Receiving the air-cargo in at least one drop zone (8), wherein the air-cargo lands within the drop zone or within a landing assisting system (9) used as part of the drop zone (8), and collecting the air-cargo from within the drop zone; and g) Delivering the e-commerce merchandise to the consumer (22) from the drop zone (8), wherein the merchandise (23) can go through an outbound sorting center (14) prior to delivery to the consumer (22), wherein the delivery process can utilize last mile delivery systems; and wherein the method is configured to achieve a Low-Cost Logistics Efficiency Index of at least 100, as defined by the equation below:

Low Cost Logistics Efficiency Index =

$$\frac{nP}{nCFC} \times WI_{AD} \frac{(W_{AD} - 5)}{W_{AD}} \times VI_{AD} \frac{(V_{AD} - 75)}{V_{AD}} xd \times nC$$

where:
nCFC is the total number of CFCs (2) utilized with the low capital and operation cost logistics method;
nP is the total number of packages delivered per day through air-drop delivery;
$W_{AD}$ is the average weight of the air cargo that is delivered through air-drop delivery in kg.
$V_{AD}$ is the average air-drop velocity of the air-cargo in km/h;
d is the average distance that the air-cargo (43) travels from a CFC (2) and/or transfer airport (12) to its target drop zone;
nC is the average number of different consumers (22) that receive the merchandise (21); and
$WI_{AD}$ is a binary index relating to the average weight of the air-cargo (43) that contains the e-commerce merchandise and that is air-dropped from aircraft (5), and is a binary number as calculated below:

$$WI_{AD} = \begin{matrix} 0, \text{when } W_{AD} := 5 \text{ kg} \\ 1, \text{when } W_{AD} > 5 \text{ kg} \end{matrix}$$

$VI_{AD}$ is an index relating to the average velocity that the air-cargo (43) that contains the e-commerce merchandise is dropped from the aircraft (5) during the air-drop delivery, and is a binary number as calculated below $$VI_{AD} = \begin{matrix} 0, \text{when } V_{AD} := 75 \text{ km/h} \\ 1, \text{when } V_{AD} > 75 \text{ km/h} \end{matrix}$$

The present invention further provides a low capital and operation cost e-commerce logistics system that allows for the fast and massive delivery of e-commerce merchandise (21) to high-population density urban areas, the system comprising:

A computing system (3) capable of receiving fulfillment information (23) for at least 1,000 placed orders per day from at least one of an online shopping platform or a consumer (22); where the computing system (3) is in network connection or in communication with the at least one CFC (2), in order to receive fulfillment information of the placed orders;

At least one air-cargo (43) that carries the e-commerce merchandise that is to be delivered into a final logistics point (11) located within a high-density population urban area, the air-cargo (43) comprising at least one of a multibox package (41), an individual package (42), or combinations thereof;

At least one sourcing location (17) for the e-commerce merchandise (21), where the sourcing location (17) comprises at least one of a Central Fulfillment Center (CFC) (2), an outbound sorting center, a drop zone, or a transfer airport, wherein the CFC (2) has a storage area of at least about 5,000 m², a height of at least two meters between a floor and a top-most roof of the CFC (2) and configured to store at least 10,000 items of e-commerce merchandise (21), At least one designated urban delivery area (18) located up to 50 km away from the sourcing location (17), and at least one manned urban delivery aircraft (5a) configured to carry the at least one air-cargo (43), where the aircraft (5a) is configured to carry a total air-cargo load of at least 200 kilograms in average and that allows to deliver the air-cargo (43) to the at least one urban delivery area (18), and wherein the delivery of the air-cargo (43) is performed either by landing at the final logistic point (11) or through a relatively static aerial delivery into the designated urban delivery area (18), wherein the urban delivery aircraft (5a) comprises helicopters, among others;

At least one collection apparatus for the collection of the at least one air-cargo from the designated urban delivery area.

At least one delivery system (15) arranged to deliver the e-commerce merchandise (21) to consumers from the urban delivery area (18).

The present invention further provides a low capital and operation cost e-commerce logistics method that allows for the fast and massive delivery of e-commerce merchandise (21) to high-population density areas, comprising the following steps:

a) Providing a computing system (3) that receives fulfillment information (23) of an order for e-commerce merchandise (21) placed through at least one of an online shopping platform or a consumer (22), where the computing system (3) is capable of receiving at least 1,000 orders per day and is in network connection or communication with at least one Central Fulfillment Center (CFC) (2) having a storage area of at least about 5,000 m², a height of at least two meters between a floor and a top-most roof of the facility, and that is configured to store at least 10,000 items of e-commerce merchandise (21);

b) Selecting, sorting, and preparing, based on the fulfillment information received by the computing system (3), the e-commerce merchandise (21) as at least one of a multibox package (41), an individual package (42), or combinations thereof, wherein the at least one multibox package (41), individual package (42), or combinations thereof are then configured or prepared as part of at least one air-cargo (43);

c) Sourcing the at least one air-cargo (43) from a sourcing location (17) that comprises at least one of a CFC (2), an outbound sorting center (14), a drop zone (8), or a transfer airport (12) and loading the air-cargo (43) into a manned urban delivery aircraft (5a) configured to carry the at least one air-cargo (43) and deliver such air-cargo (43) into a designated urban delivery area (18), wherein the delivery of the air-cargo (43) is performed either by landing at the urban delivery area (18) or through a relatively static aerial delivery into the designated urban delivery area (18);

d) Receiving the air-cargo (43) in the least one urban delivery area (18), collecting the air-cargo (43), and delivering the e-commerce merchandise contained in the air-cargo through a delivery system (15), wherein the delivery system (15) can utilize last mile delivery systems, and wherein the Urban Delivery Index as described below is a positive number to achieve and validate the logistics of the method of the present invention:

$$\text{Urban Delivery Index} = WI_{UD} \frac{(W_{UD} - 5)}{W_{UD}} xd \times nC$$

Where:
$W_{UD}$ is the average weight of the air-cargo (43) that is delivered to the urban delivery area in kilograms (kg)
$WI_{UD}$ is an index relating to the average weight of the air-cargo (43) that contains the e-commerce merchandise and that is delivered through the aircraft (5a) as part of the system and method of the present invention, and is a binary number as calculated below:

$$WI_{AD} = \begin{matrix} 0, \text{ when } W_{AD} := 5 \text{ kg} \\ 1, \text{ when } W_{AD} > 5 \text{ kg} \end{matrix}$$

d is the average distance that the air-cargo (43) travels from the Sourcing location (17) to the final logistics point (11) or urban delivery area (18)
nC is the average number of different customers (22) that receive their e-commerce merchandise through the system and method of the present invention for urban deliveries.

The present invention further provides a low capital and operation cost e-commerce logistics system that allows for the fast and massive delivery of e-commerce merchandise in an extensive geographical area, reducing the need for building, operating, or using a large number of fulfillment centers located near the consumers as in traditional e-commerce de-centralized logistics, the system comprising:

A processing system (16) including a processor (161), and
A memory (162) that stores executable instructions that, when executed by the processing system, facilitates performance of operations, the operations comprising at least:
Receiving, at a computing system (3), fulfillment information (23) of an order for e-commerce merchandise (21) placed through at least one of an online shopping platform or a consumer (22), where the computing system (3) is capable of receiving at least 10,000 orders per day, wherein the computing system (3) is in network connection or communication with at least one Central Fulfillment Center (CFC),
Receiving and processing the fulfillment information (23) at the least one Central Fulfillment Center (CFC) (2) having a storage area of at least about 5,000 m², a height of at least two meters from a floor and a top-most roof of the facility to store at least 10,000 e-commerce merchandise, the CFC being located at a distance of no more than 50 km from a runway facility for at least one of take-off or landing of a manned aircraft;
Instructing a sorting system (4) in connection with the at least one CFC (2) to:
  i. select and sorting the merchandise (21) stored in the at least one CFC (2) based on the fulfillment information (23),
  ii. prepare at least one of a multibox package (41), an individual package (42), or combinations thereof that contain the selected merchandise (21), and iii. configure or prepare at least one air-cargo containing the arranged merchandise, the air-cargo being suitable for air-drop from an aircraft;

Determining a drop zone (8) for the at least one air-cargo (8), the drop zone (8) configured to receive the air-cargo dropped from the aircraft;

Arranging and sending air-cargo information to the determined drop zone (8), the determined drop zone comprising at least one of a landing assisting system (9) or a path guidance system (10), wherein the landing assisting system is configured to reduce the landing speed of the air-cargo and/or providing a softer landing of the at least one air-cargo (43), and wherein the path guidance system is configured to provide guidance to the at least one air-cargo (43); and Generating a delivery instruction to a delivery system (15) arranged to deliver the e-commerce merchandise (21) to consumers from the drop zone (8), wherein the e-commerce merchandise can optionally go through an outbound sorting center (14) before being delivered to the consumer.

BRIEF DESCRIPTION OF THE DRAWINGS

In the drawings in which like elements are identified with the same designation numeral:

FIG. 24 illustrates a functional block diagram of a computer system which may be used to practice the invention

DETAILED DESCRIPTION OF THE INVENTION

Figure 1:
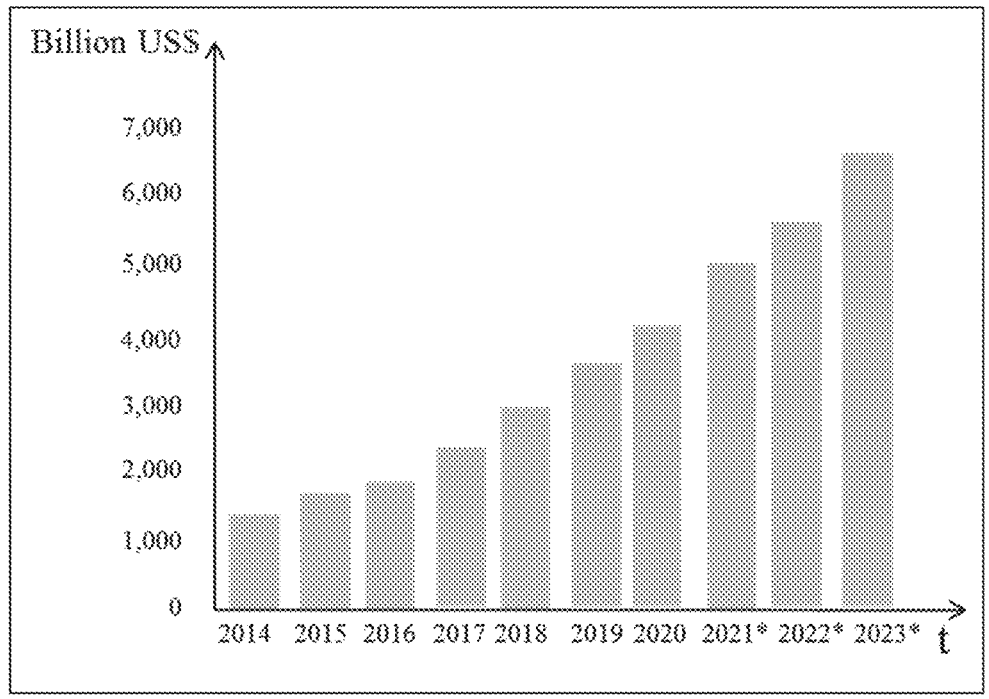
FIG. 1 shows the retail e-commerce sales worldwide from 2014 to 2023 (projected).
Figure 2:
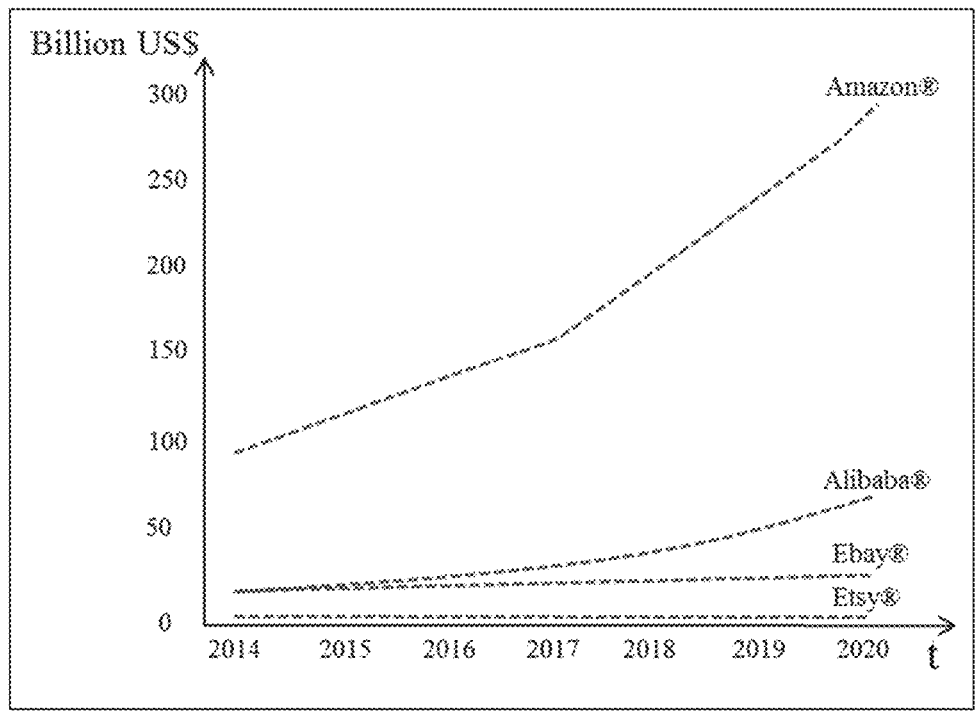
FIG. 2 shows the exponential revenue growth of Amazon compared to other e-commerce businesses.
Figure 3:
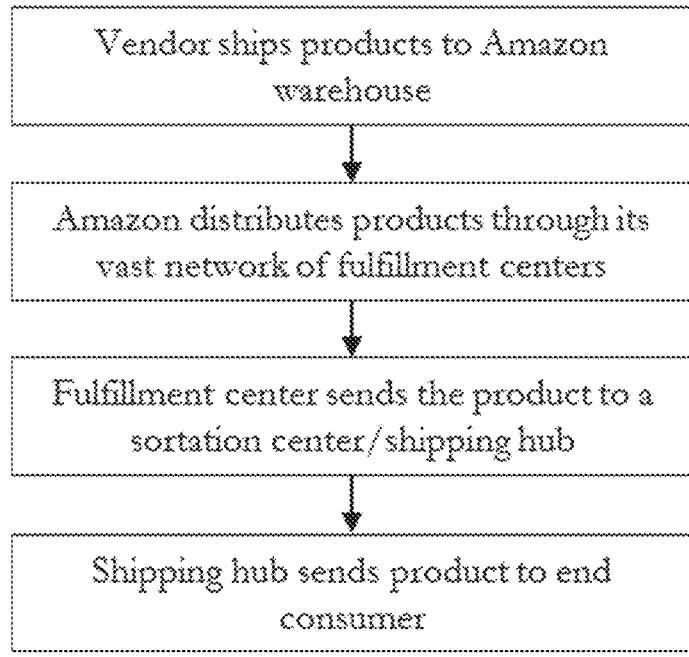
FIG. 3 shows a simplified schematic of Amazon's logistics systems for fast delivery of products to consumers. This system is repeated at each fulfillment center, with more than 180 in the U.S.
Figure 4:
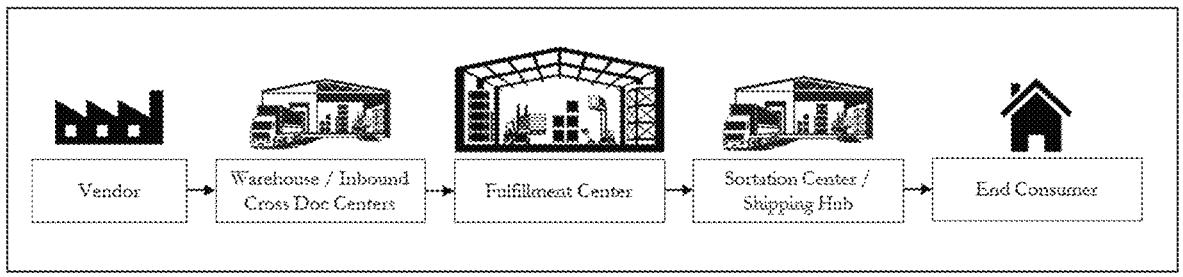
FIG. 4 shows a simplified schematic of Amazon's logistics systems for fast delivery of products to consumers. This system is repeated at each fulfillment center, with more than 180 in the U.S.
Figure 5:
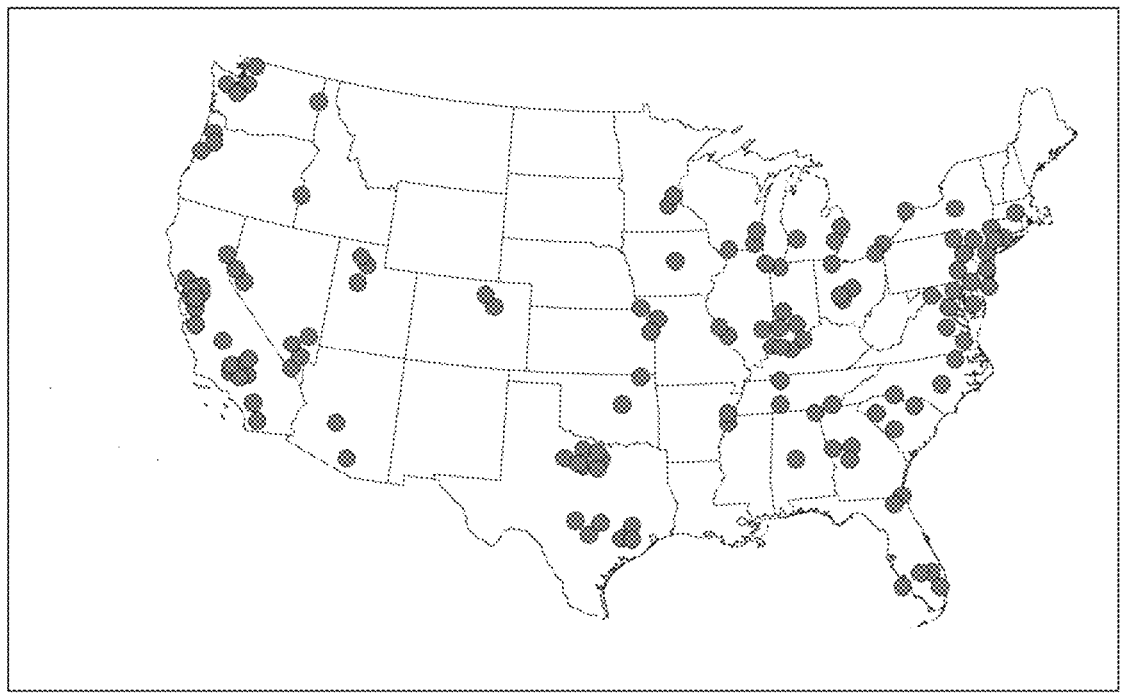
FIG. 5 shows a schematic map of the U.S. and a referential number and location of Amazon's current and planned fulfillment centers.
Figure 6:
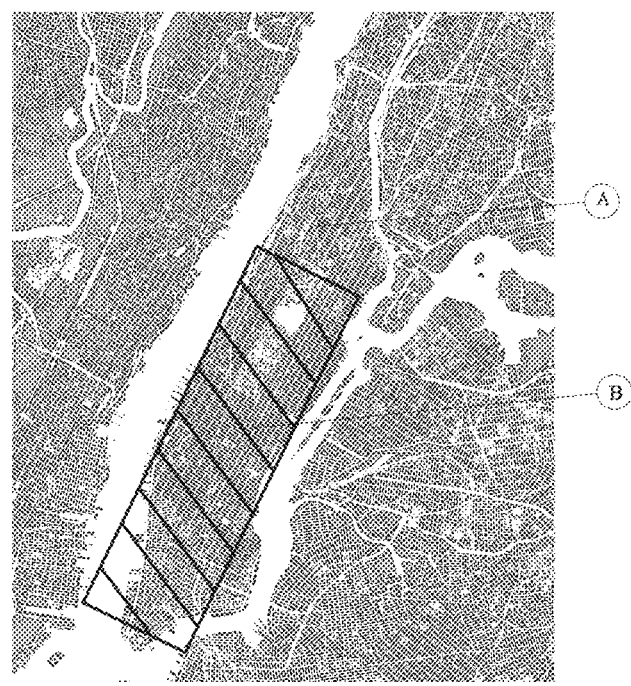
FIG. 6 shows a map of Manhattan (A) and a referential surface stricken off to show the estimated footprint (B) of Amazon's fulfillment centers in reference to the size of Manhattan.

The present invention discloses low capital and operation cost logistics systems and methods that allow for the fast and massive delivery of e-commerce merchandise in an extensive geographical area through air-drop deliveries, reducing the need for constructing, operating, or using a large number of fulfillment centers or fulfillment center space located near the consumers. The present invention also discloses a system and method for the fast and massive delivery of e-commerce merchandise to high-population density urban areas.

The present invention, compared to other e-commerce logistics systems and methods, dramatically reduces the required infrastructure—such as fulfillment centers that have high capital and operating costs, among others—by allowing building, operating, or using one or a small number of Central Fulfillment Centers (CFCs) or less fulfillment center space than conventional de-centralized systems and methods, where the CFCs can be located far from consumers, while still providing for fast delivery of merchandise to the consumer. Additionally, the present invention allows reducing the use of current individual cardboard packaging required for individual orders from consumers, by sorting merchandise from different orders into at least one multibox package (41), which is sorted at the origin CFC (2) that houses such merchandise based on the final destination zone (such as a block, neighborhood, small town, small city, and even a same building, among others), and which provides for a more efficient and sustainable delivery system and method.

The logistics systems and methods of the invention allow to ship and deliver a very large Number of Packages, defined as "NP" per day through air-drop delivery, at the same time requiring utilizing a low number of Central Fulfillment Centers (CFCs) for such purpose and for sorting and/or preparing such packages for air-drop delivery, wherein the total number of different consumers that receive the e-commerce merchandise is defined as "NC", wherein the number of CFCs is defined as "nCFC", wherein the total weight of the air-cargos are considered as "WAD", which are dropped at an air drop velocity defined as "VAD", and wherein the total distance that the air-cargo travels from the sourcing CFC to a transfer airport and/or a target drop zone is defined as "d". Such parameters and variables allow to define important logistic indexes associated with the methods of the present invention, such as the Low-Cost Logistics Efficiency Index, the Distribution Index, and the Urban Delivery Index, as defined in the following sections, and which allow to confirm that the systems and methods of the present invention are being utilized and performed for the fast delivery of a large number of e-commerce merchandise.

It is important to highlight that the present invention provides for low capital and operation cost logistics systems and methods for fast and massive delivery of e-commerce merchandise, which is related to the first miles logistics of e-commerce delivery, and not the last mile delivery, where the first miles logistics is a term defined in this application as the logistics required to sort and transport e-commerce merchandise from its storage location (i.e., the inventory in a Central Fulfillment Center) or other locations to a final logistic point that is close to the consumer and from where the last mile delivery process is performed either directly, or passing through an outbound sorting center in between. In that sense, any services, systems, or methods for last mile delivery processes such as the use of unmanned aerial vehicles (such as drones) with low cargo weights (usually up to four lbs.), rideshare services (such as Uber), or others that can be used after the logistics systems and methods from the present invention—i.e., after the e-commerce merchandise is delivered to a drop zone—may be complimentary and an additional system and/or step to the present invention.

Any last mile delivery systems or methods may be complimentary to the systems and methods from present application. Therefore, is the present invention involved or related to a last mile delivery system such as unmanned vehicle deliveries directly to the consumer's residences? The answer is no, as the present invention aims at providing innovative low capital and operation cost logistics systems and methods that achieve short delivery timeframes for thousands of products in large extensive areas and to many different customers, aiming at getting such products as close to the customers as possible previous to the last mile delivery process. Any new technologies focused on the last mile delivery for delivering products to the consumer may be used as a complement, but are not the main objective of the present invention.

As previously described, traditional e-commerce logistics systems and methods generally store the merchandise in multiple fulfillment centers near consumers to allow for a fast delivery of products from that close-by fulfillment center to the consumer. This requires a multiplicity of the same products to be stocked at many fulfillment centers to accomplish a same-day, one day, or even a two-day delivery schedule. For example, in the case of having tenths of fulfillment centers, then the product may need to be stocked at each of those fulfillment centers to achieve these short delivery timeframes. The present invention, instead, allows for the storage of the merchandise far from the consumers in one or few Central Fulfillment Centers (CFCs), where the merchandise is selected, sorted, and packaged as part of an air-cargo that is delivered in a fast manner to a Final Logistic Point close to the consumer, previous to the last mile delivery process.

This innovative low capital and operation cost logistics system and method allows for a fast delivery, reducing the need of having to build, operate, and/or use a high-capital and high-operation cost warehouse network with an expansive footprint. The present invention allows to have, operate, or use just one or a few Central Fulfillment Centers or fulfillment center space in connection with the system and method from the present invention, compared with leading de-centralized models, to achieve fast delivery of a large quantity of products. The present invention provides for an e-commerce platform and logistics, which allows to achieve fast delivery of large quantity of e-commerce merchandise.

Preferably, the present invention allows to build or make use of at least 20% less fulfillment centers or fulfillment center space than leading de-centralized model companies, preferably at least 50%, and more preferably at least 90% less fulfillment centers or fulfillment center space, while achieving the same or even higher delivery capacity and/or velocity than leading de-centralized models. Therefore, the disruptive systems and methods according to the present invention, in an innovative manner, achieve short delivery times, including same day delivery within a few hours for many products ordered online with minimum infrastructure requirements.

As a reference, today only about 1% of Amazon's product offer allows for same-delivery, while the present invention allows that most of the merchandise offered through online shopping platforms and that is located in the Central Fulfillment Centers can be delivered in short delivery timeframes, like same-day delivery and within a few hours. Notwithstanding, the present invention allows to reduce the use and even potentially eliminate currently built fulfillment centers for de-centralized logistics companies that wish to use the system and method from the present invention. The present system and method can also be used by companies that currently have a de-centralized model, by allowing to make their operations more efficient and reduce logistics costs compared to their current operations by using only a portion of the infrastructure network that may be in operation previous to the implementation and use of the present invention's systems or methods and that may also reduce the need of building future fulfillment center infrastructure.

The present invention is the result of a combination of necessary components and methods to achieve an innovative solution in an innovative manner, providing a low capital and operation cost alternative to current e-commerce logistics trends, and providing an innovative and disruptive logistics system and method that allows large and small companies to enter or grow in the e-commerce market, and also can provide lower entry costs for vendors, as well as greater convenience and delivery times for consumers.

Definitions

As used herein, "consumer" (22) refers to the individual or automated system that performs the online shopping process for at least one product, and is selected from the group comprising a person, a software, a business, a company, or an entity, among others.

As used herein, "e-commerce merchandise" (21) or alternatively "merchandise" refers to the e-commerce merchandise that is offered by an online selling platform where consumers make their orders and purchase products. The merchandise comprises, but is not limited to, entertainment products, electronics, clothing, accessories, home products, tools, fresh products, niche products, sporting goods, outdoor products, automotive equipment, products and accessories, industrial equipment and products, documents, or printed material, among many others.

As used herein, "air-cargo" (43) refers to at least one or a plurality of packages selected from the group comprising individual packages, multibox packages, or combinations thereof; or a container, pallet, or platform that carries at least one package containing e-commerce merchandise, and that may be transported, air-dropped or air delivered by an aircraft.

As used herein, "air drop delivery" refers to the type of delivery where at least one air-cargo is dropped or delivered from an aircraft while in flight, without the need of landing.

As used herein, "first miles logistics" refers to the logistics required to sort and transport e-commerce merchandise from its storage location (i.e., inventory at a Central Fulfillment Center) or other locations to a final logistics point that is close to the consumer and from where the last mile delivery process is performed, and wherein the final logistics point is selected from the group comprising a drop zone, an outbound sorting center, a Central Fulfillment Center, a transfer airport (12), an urban delivery center, or other locations. In a preferred embodiment of the invention, the final logistics point is a drop zone.

As used herein, "last mile delivery" refers to the type of delivery that delivers the packages containing the e-commerce merchandise to the consumer. It is the final step of the complete delivery process. The last mile delivery process will depend on the number of packages to be delivered and their destination, based on their specific delivery addresses, the proximity of such points to the Central Fulfillment Centers, transfer airports (12), drop zones, outbound sorting centers, urban delivery centers, or others locations from where the packages are sourced from before the last mile delivery, among others. Some examples of last mile delivery companies include Postmates, Amazon Flex, UberRush, USPS, UPS, FedEx, in-house services, and/or automated systems like self driving vehicles and aircraft, among others. The last mile delivery process generally comes after the first miles logistics process.

Low Capital and Operation Cost System of the Present Invention

The low capital and operation cost logistics systems of the present invention provides for fast and massive delivery of e-commerce merchandise, including same day delivery, of thousands of items and packages, in extensive geographical areas, reducing the need for building, operating, or using multiple fulfillment warehouses or fulfillment center space located near the consumers as in traditional e-commerce de-centralized logistics, which allows generating a revolution in the e-commerce industry worldwide. In a disruptive manner, the systems of the present invention are configured to facilitate the logistics for e-commerce delivery processes, and also may allow at the same time reducing the use of massive quantities of cardboard packages that are used for protection and containment for e-commerce orders, being sustainably beneficial for the e-commerce market, the environment, and the consumer.

The system from the present invention provides for the storage of the e-commerce merchandise in one or a small number of Central Fulfillment Centers (CFCs), and provides for the shipping of the merchandise in air-cargos (43) that are loaded into manned aircraft suitable for air-drop delivery, where the aircraft then drops said air-cargos (43) into drop zones (8) strategically positioned near the consumers, without the need of landing at such drop zone. The air-cargos (43) land within a designated drop zone (8), and then they are retrieved and the merchandise contained in such air-cargos may be delivered to the consumer from the drop zone, or it can go through an outbound sorting center, or other locations, before delivery to the consumer.

Additionally, the system from the present invention is configured so that the products are sorted at the origin storage location (CFC), or other locations, so that products from different orders that are destined to a specific zone (such as a block, neighborhood, small town, small city, and even a same building) are placed in the same package through the use of a multibox package, which allows to simplify the e-commerce logistics and minimize the massive use of individual cardboard boxes for individual orders or consumers.

More specifically, the low capital and operation cost logistics system of the present invention comprises at least one Central Fulfillment Center (CFC) (2), a computing system (3), a sorting system (4), at least one manned air-drop delivery aircraft (5) at least one air-drop delivery aircraft, at least one air-cargo ejection system (7), at least one drop zone (8), at least one of a landing assisting system (9) or a path guidance system (10), and a at least one delivery system (15).

Central Fulfillment Center (CFC)

A Central Fulfillment Center (CFC) (2) according to the invention denotes the facility where the e-commerce merchandise is stored. The at least one CFC (2) has a minimum area of about 5,000 m² (as measured as total usable area for storing e-commerce merchandise) and a height of at least about two meters considering the total distance between the floor of the facility and the top-most roof of the facility.

The at least one CFC (2) is configured so that it is able to store at least 10,000 items of e-commerce merchandise inventory, where the merchandise is offered for sale in at least one e-commerce online shopping platform that allows a consumer (22) to purchase at least one merchandise item online. In another embodiment of the invention, the CFC (2) is configured so that it is able to store at least 100,000, and preferably 1,000,000 items of e-commerce merchandise that are offered for sale in at least one e-commerce online shopping platform. Examples of current e-commerce online shopping platforms include Amazon®, Ebay®, Etsy®, Reverb®, Mercadolibre®, Shopify®, among many others.

The at least one CFC (2) is preferably positioned near an airport that supports the use of aircraft such as cargo airplanes and/or jets, with a landing runway of at least 1,500 meters. In an embodiment of the invention, the at least one CFC comprises a landing runway to avoid delays and cost of commercial airports. Preferably, the at least one CFC (2) is located at a distance of no more than 50 km from a runway facility for the take-off and/or landing of a manned aircraft. More preferably, the runway facility may be located within or contiguous to the CFC to achieve an efficient loading of the air-cargos (43) prepared in the CFC (2) into at least one manned aircraft (5).

In an embodiment of the invention, the at least one CFC (2) comprises an airport. In another embodiment of the invention, commercial airports are used in connection with at least one CFC (2), providing for taking-off and/or landing of the aircraft that carries the air-cargo. In another embodiment of the invention, commercial airports may not be used. Instead, private airports may be utilized for the aircraft to take-off in order to deliver the air cargo and then return to land at the same or another airport. In this manner, an absolutely innovative and surprising effect is accomplished, unthinkable before this invention: same day delivery anywhere in the world, without only using commercial airports. It is also important to note that air shipping is often perceived as more expensive than land transportation, however, overall shipping costs may not be so different and in this case they may be even less expensive. An important factor that impacts the overall air-shipping cost is related to airport fees such as fees for using the runway, fees for using platforms, renting airport areas, and similar uses. By using private airports, such fees and costs may be considerably reduced, allowing for less expensive overall air-transport costs.

The minimal preferred geographical area that is able to be covered by the system and method of the present invention is at least 400 ha, preferably 1,600 ha, more preferably 3,600 ha, and most preferably 10,000 ha, or more.

Computing System

The system of the present invention comprises a computing system (3) capable of receiving a high volume of online fulfillment orders or fulfillment information for such orders. Such fulfillment orders are orders that may be received through a vendor, an online shopping platform, or other methods, wherein such orders have an associated fulfillment information. In an embodiment of the invention, the computing system (3) comprises at least one software of the type of ERP (Enterprise resource planning) software, OMS (Order management system) software for order entry and processing, WMS (Warehouse management systems) software for optimizing warehouse functionality and distribution center management, TMS (Transport management systems) software for managing planning of transport schemes, execution and follow-up, supply chain management software, or fulfillment/enabling systems and intelligence clouds, among others. In another embodiment of the invention, the computing system (3) has a capacity to support online ordering with thousands of daily transactions and/or orders. In a further embodiment, the computing system has a capacity to support online ordering with millions of daily transactions and/or orders. The computing system (3) and software provides for output of key data and parameters for the planning and coordination of the first miles logistics for delivery of the e-commerce merchandise with the systems and methods of the present invention.

Preferably, the computing system (3) is arranged and configured to receive at least 10,000 orders per day or the fulfillment information for such orders. In another embodiment of the invention, the computing system (3) is arranged and configured to receive at least 100,000 orders per day, or the fulfillment information for such orders. The computing system (3) is in network connection or communication with at least one CFC in order to receive fulfillment information about the placed orders.

In an embodiment of the invention, the computing system (3) is in network connection or communication with an online shopping platform where consumers are able to purchase merchandise, preferably with an offer of at least 1,000 products, or at least 10,000 products, or at least 100,000 products.

It is appreciated by the expert of the art that the current main communication technology is the internet, however, future communication platforms and technologies may be used for the same purpose for the communication of information between one platform and another.

Sorting System

The system of the present invention comprises at least one sorting system (4) to select the merchandise based on the online fulfillment order information (stock, destination address, or location within a CFC, among others) that is received through the computing system. The sorting system packages the e-commerce merchandise and prepares it appropriately as part of an individual package (42), a multibox package (41), or an air-cargo (43) that is suitable for air-drop. The computing system (3) may also define destination zones, where, preferably, the sorting system (4) packages the e-commerce merchandise orders depending on such destination zones, using either an individual package (42), a multibox package (41), or combinations thereof. In an embodiment of the invention, the sorting system allows for individual items to be identified, and orders with more than one item may be consolidated, for example, into a single location, so that they may be packed and then prepared it appropriately as part of an individual package (42), a multibox package (41) or an air-cargo (43) that is suitable for air-drop. The sorting system (4) may be supported by the use of picking machinery, fully automated robots or other devices. In certain embodiments, the sorting system (4) comprises manual picking and sorting by at least one person. In another embodiment, when a transfer airport (12) is utilized, the sorting system may assemble the e-commerce merchandise as an individual package (42) or a multibox package (41), so that the same is subsequently assembled as an air-cargo (43) prior to be loaded into the aircraft (5) at the transfer airport (12).

Use of Multibox Packages

Today, one of the large worldwide problems that result from the growing e-commerce market is the massive use of cardboard boxes for shipping e-commerce products and/or individual orders, where accumulation of cardboard boxes is a growing problem for consumers that need to coordinate logistics for recycling and/or disposal of the e-commerce shipping packages. There are studies that indicate that this is a negative factor of e-commerce among consumers. There are few massively used alternatives that have been proposed to reduce the use of cardboard boxes, where the end responsibility of recycling and/or disposal has been mainly transferred to the consumer. Further, the use of such boxes to ship individual products or orders generates inefficiency of volume usage, as the same product, that already has a primary packaging, is placed inside a secondary package, where it has been estimated that in average the void volume within a shipping box is at least 30%, which means that 30% of the volume within such box is not used and just air, increasing shipping costs and reducing efficiency in volume management.

In an innovative manner, the present invention also allows to reduce the massive amounts of cardboard packages that are used worldwide to sort, ship, and deliver individual e-commerce orders from individual consumers, providing a more sustainable operation and at the same time making the process more efficient. This is achieved by the use of a multibox package (41) for the delivery of the e-commerce merchandise. A multibox package (41) is a package that contains products from more than one order or consumer, where such products are destined to a same predefined zone such as a small town or city, a same block, neighborhood, building, condominium, master planned community, or others. In an embodiment of the invention, the computing system of the present invention determines which e-commerce merchandise has similar destination addresses or are within a predefined zone as mentioned above, and such orders and products are sorted by the sorting system into at least one multibox package at the origin (the CFC where such inventory is located and that is has been determined to be the Origin CFC for such product), therefore minimizing the need for individual protection and packaging of such products or orders, and placing together orders from different consumers within the same multibox package. Therefore, the present invention, in an innovative manner, allows for the use of a multibox package (41), which allow to reduce the use of individual packages and therefore reduce the use of cardboard or other shipping materials commonly used for shipping merchandise. The present invention's low capital and operation cost logistics systems preferably uses at least one of an individual package (42) or a multibox package (41), for the delivery of the e-commerce merchandise.

In a preferred embodiment of the invention, the e-commerce merchandise is sorted together into multibox packages (41), which allow to reduce the shipping volume without requiring individual packages (42) for each order, and which may be sorted by the sorting system (4) at the at least one CFC (2) based on the fulfillment information and the destination address of such orders, as previously explained. Therefore, multibox packages (41) preferably contain e-commerce merchandise (21) that have to be delivered to different delivery addresses within the same delivery zone.

In an embodiment of the invention, the multibox packages (41) are capable of carrying orders of at least ten (10) different consumers at the same time. In another embodiment of the invention, the multibox packages (41) are capable of carrying orders preferably of at least twenty (20) different consumers at the same time.

Preferably, the products within the multibox packages (41) are delivered to at least two different final delivery addresses or consumers. More preferably, the e-commerce products contained within the multibox packages (41) are delivered to at least ten different final delivery addresses or consumers.

Therefore, preferably, a set of products or orders that go into the same delivery zone may be grouped together in a multibox package (41). For example, if a set of products from different individual consumers or bound to different delivery addresses are sorted together and they need to be delivered within the same zone, after the air-drop is performed at the drop zone (designated for such delivery zone), such multibox package (or a sections or compartment(s) within) is provided to a last mile delivery agent that may put it in their care and makes the delivery route for delivering the final product/order to the consumer. Therefore, the multibox package (41) may protect a set of products/orders during shipping and therefore it may not require that each product or order has its own protective cardboard box or filling materials, reducing the amount of shipping materials and its consequent need of disposal and/or recycling by the consumer. Therefore, in an innovative manner, the use of multibox packages allows that the delivery to the consumer may be performed without individual packaging, not only making the shipment of such merchandise more efficient by using less volume (which results in more products being transported and less costs), but also reducing the huge problem of cardboard boxes used worldwide for shipment of products and also simplifying the e-commerce logistics by performing the sorting in the origin based on the final destination zone, including neighborhoods, blocks, condominiums, master planned communities, buildings, small towns or cities, among others.

In an embodiment of the invention, the sorting system (4) may sort and place the products inside the multibox packages (41) where the products may only use their primary packaging, and therefore there may be no secondary packaging that generates a larger volume, where the multibox packages (41) are sorted depending on the final destination of the orders.

In an embodiment of the invention, the multibox package (41) is configured so that it is a box or package formed by one or more pieces or panels of a material selected from cardboard, paperboard, plastic or other suitable material. Multibox packages may be able to store different products that will be delivered to different consumers using their primary packaging (not requiring additional packaging) based on their final destination. Multibox packages (41) may also have sections or compartments within that can separate and detach from the main package. For example, once an air-cargo that contains at least one multibox packages (41) is air-dropped into a specific drop zone, the aforementioned sections and/or compartments may be separated to distribute the products to different zones through different last-mile delivery services or processes. The actual delivery to consumers may be, therefore, performed without individual packages that contain the products, but instead, such products may be placed inside of small delivery bags or similar containers to provide privacy as to the delivered product.

In an embodiment of the invention, a multibox package is configured to carry about 10 to 30 kgs in weight in merchandise, which advantageously may be operated or handled manually by a single person, not requiring large machinery or equipment to achieve the collection, dismantling (if needed), and retrieving the merchandise from the multibox package or any compartments or sections within such multibox package to the last mile delivery agent or service. For example, a multibox package of about 15 kgs in weight with dimensions of about 40 cm×40 cm×40 cm housing a set of products for different clients, may be managed by a person, and fits into most last mile delivery vehicles, therefore not requiring additional machinery or equipment for such purpose.

Figure 17:
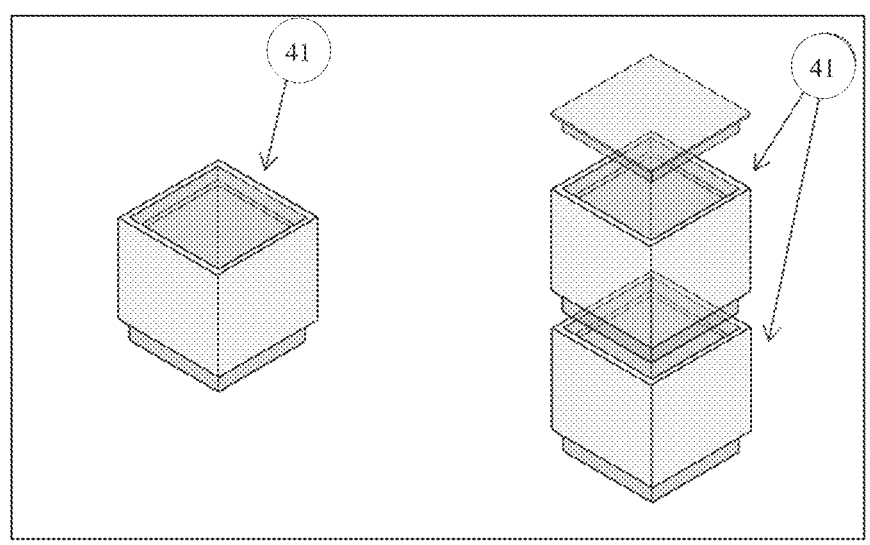
FIG. 17 shows simplified schematics of an embodiment of the multibox package, wherein the multibox package is stackable.
Figure 18:
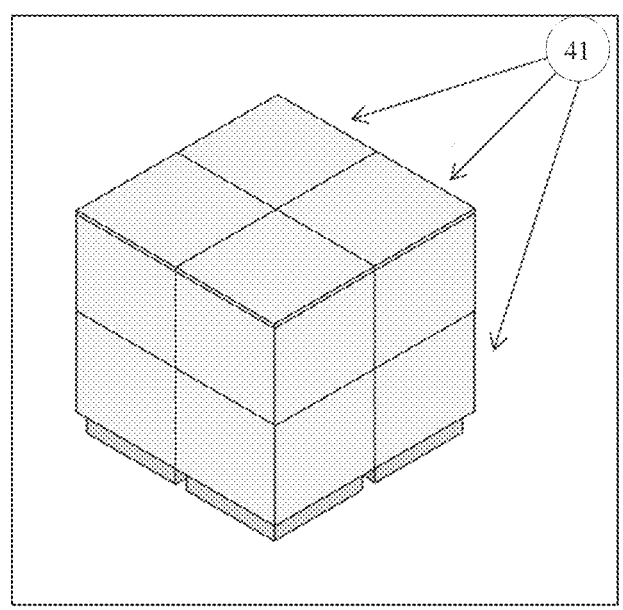
FIG. 18 shows several multibox packages (43) stacked.

In an embodiment of the invention, the multibox packages (41) may be stackable. FIGS. 17 and 18 show an embodiment of the invention, where a multibox package (41) is shown by itself or stacked as a reference.

The use of multibox packages (41) according to the present invention allows to minimize the limitation of volume carried by the air-drop planes or other aircraft, such as transfer aircraft or urban delivery aircraft, among others. This is achieved by placing a set of products and/or orders together in the same multibox package (41) or one of its sections or compartments, which allows to reduce void spaces and therefore volume maximization for shipped goods is achieved, allowing to reduce shipping costs.

In another embodiment of the invention, the packages containing the e-commerce merchandise are air-dropped or delivered to a final logistic point by themselves as independent packages, and not as part of a multibox package that includes different orders. Individual packages (42) are packages that carry one order that has to be delivered to a single delivery address, and therefore does not comprise orders from more than one customer at a time. These types of packages are commonly used for the delivery of e-commerce orders around the world.

In a further embodiment of the invention, a combination of individual packages and multibox packages is used in connection with the system of the present invention.

The volume of the multibox (41) or individual (42) packages may determine how many packages will fit within the air-drop delivery aircraft (5), or in transfer aircraft (13), or in the urban-delivery aircraft (5a), or other aircrafts. Therefore, suitable systems and methods that allow to reduce the volume of packages considering the e-commerce merchandise's own volume and dimensions are recommended. In this sense, parameters such as the Dim Weight, or "Dimensional Weight" may be suitable, as they may provide an estimation of the amount of space that a package occupies in relation to its weight, which is calculated by multiplying the Length, Width, and Height of a Package in inches (cubic size of package). Smaller Dim Weights relate to overall smaller volumes and more efficient volume usage. Some carriers and delivery companies divide the DIM Weight by a divisor to calculate a relative or average weight for such package, and compare it to the actual weight of the package.

In the case of the present invention, it is desirable to have packages with a small dimensional weight and efficient volume utilization, to achieve more efficiency in number of packages able to be carried by the aircraft (5) and so that the air-cargos (43) are more efficient space-wise. In this sense, a parameter to consider for the present invention is the volume and shape of the e-commerce merchandise (21), which ideally should be as small and compact as possible to maximize the number of merchandise in the air-cargos (43) and maximizing the use of cargo volume in the selected aircraft.

In another embodiment of the invention, the air-cargos (43) are capable of carrying packages directed to a business, such as in B2B deliveries (e.g., "Business to Business" deliveries).

Air-Drop Delivery

The system of the present invention requires that the at least one multibox package (41), or at least one individual package (42), or combinations thereof, are part of the at least one air-cargo (43) that will be loaded into an aircraft (5) for air-drop delivery.

While the system requires at least one multibox package or individual package as part of the at least one air-cargo, it can be appreciated by the skilled in the art that a plurality of individual packages, multibox packages, or combinations thereof may be configured as part of the at least one air-cargo. Such multibox packages (41) and/or individual packages (42) may be combined, placed together, attached to each other using different materials and elements (such as plastic wrapping), placed in pallets, containers, or combinations thereof depending on the type of aircraft, air drop requirements, travel route, or other definitions.

Preferably, the at least one air-cargo (43) has an average weight of at least about 5 kgs. In an embodiment of the invention, the air-cargo (43) is designed and configured so it can support a drop in a falling path at speeds of at least 4 m/s without suffering considerable damaging deformation of the cargo content.

Therefore, an air-cargo (43) according to the present invention comprises at least one of an individual package (42), or multibox package (41), or combinations thereof. In alternative embodiments, such packages may be transported and/or air dropped in combination with other individual (42) or multibox packages (41), grouping them together by using wrapping systems and materials, such as, cushioning wrapping systems with bubbles, using bags such as plastic bags or plastic films, or other alternatives. Such packages may be also placed within pallets, platforms and/or containers that may be used one time or be re-usable and may serve for many different deliveries through their lifetime.

The air-cargo (43) may comprise inclement-weather or all-weather protection, such as waterproof enclosures and materials that are impervious to rain, snow, condensation, etc., and, in some cases, that allow water landing conditions. Additionally, the air-cargo (43) may comprise temperature protection enclosures and/or temperature controlled systems. Such temperature-controlled protection is even more relevant depending on the type of e-commerce merchandise, wherein fresh products or products that require a temperature controlled environment can be delivered using such enclosures or systems. The air-cargo (43) may also comprise flotation affixing means to flotation systems, so that the air-cargo can be dropped over water and be able to float for an easier recovery.

In summary, the air-cargo may be an individual package (42), or a multibox package (41), or combinations thereof by themselves, or it may include additional protection or grouping elements in order to prepare such packages for the air-drop process.

The system of the present invention also includes at least one manned air-drop delivery aircraft (5) that is able to carry the at least one air-cargo (43) in order to air-drop such at least one air-cargo during flight.

The at least one air-cargo (43) according to the present invention is loaded into the aircraft (5), which is capable of carrying at least 2,000 kilograms as an average total air-cargo load (the sum of all air-cargos in the aircraft), so that the air-cargos (43) are delivered to target drop zones (8) through the use of such aircraft (5) that ejects the air-cargos (43) during flight so that they land within such target drop zones (8) that are strategically localized near the consumers, without the need of landing at such drop zone (8).

The aircraft (5) may drop the air-cargo (43) in one drop zone (8), but in many cases may drop more than one air-cargo (43) in many different drop zones (8) during the same flight, including drop zones in villages, rural areas, cities of less than 10,000 people in population, different areas of the same city, among other alternatives, without the need of landing, and return to its landing airport as a preferred option, although other airports/runways may be used.

The possibility of getting to so many small towns in a fast manner and at low capital and operation costs is not feasible or imaginable with current de-centralized logistics systems or methods. As used herein, "manned" refers to an aircraft that is able to be piloted by individuals on board the aircraft. The aircraft (5) is configured to be able to fly at an average speed of over 200 km/hr., preferably over 500 km/h, and more preferably over 700 km/h. Such average flying speeds may be different and lower when the air-cargo is dropped over the drop zone (8). In a preferred embodiment of the invention, the aircraft is a turboprop aircraft operated by pilots. In another embodiment of the invention, different types of manned aircraft can be used, such as helicopters, airships (such as blimps), propeller aircraft, and jet aircraft, among others.

Aircraft (5) that is suitable for air drop delivery generally have an operative air drop system at their rear section. This type of air-drop delivery aircraft (5) is selected to provide air drop deliveries generally within a range of up to 500 km from their take-off location, which may be an airport nearby, or associated to at least one CFC, or a transfer airport (12).

The air drop delivery aircraft (5) air drops the air-cargo (43) in a planned route, dropping the different air-cargos (43), that may comprise multibox packages (41), individual packages (42) or combinations thereof, and returns to the same location, or to another location depending on its route and distances between each other or any other conditions.

In embodiments of the invention, the aircraft (5) may perform circular paths in order to reach the same or nearby drop zone locations within the same trip, depending on the number and type of air-cargos that need to be delivered to a specific drop zone. This might be relevant for drop zones (8) that have a limited rate of receiving air-cargo packages, or also in situations where the amount of packages to be dropped from the plane surpasses the time where the aircraft (5) can make the air-drop delivery in order for the packages to effectively reach and fall within such drop zone.

In an embodiment of the invention, the aircraft (5) drops the air-cargo (43) in more than one drop zone (43) before landing. In other embodiments of the invention, the aircraft (5) drops the air-cargos (43) in more than five, or more than ten drop zones (8) before landing.

Dropping the air-cargo (43) may be performed at different altitudes and at different speeds, depending on the type of aircraft, the type of landing assisting system (9) or path guidance system (10) used, environmental or weather conditions, regulatory requirements, size of the drop zone, nearby populations, and safety requirements, among others. In an embodiment of the invention, the aircraft (5) may lower its altitude and/or speed before dropping the air-cargo.

Some examples of aircraft suitable for air drop deliveries comprise the Hercules C-130 models, the CASA 212 or 295 models, the Antonov AN 12, 26, 74 or 124 models, or the Airbus 400M models, among others that may be used or developed for such purpose. Other aircraft models can be adapted for air-drop deliveries as needed.

The aircraft (5) may comprise an air-cargo ejection system (7) that selectively drops the specific air-cargo (43) from the aircraft (5) in selected drop zone areas during flight. The ejection system (7) allows to drop packages while the plane is in route, where the flying route is defined to pass over or near the target drop zones where the air-cargo are destined to be dropped to and received at. The aircraft (5) may carry multiple air-cargos (43) which may be dropped consecutively and selectively given the plane route and target drop zones.

Air-cargos (43) may be put together and dropped as one larger package, and not necessarily separately. The ejection system (7) may comprise a mechanical system arranged and configured to eject the air-cargo from the aircraft. In another embodiment of the invention, the ejection system (7) comprises a person that coordinates, aids in, or performs the ejection of the air-cargo. The ejection of a specific air-cargo (43) is performed when needed, based on the target drop zone for such specific air-cargo (43). The ejection system (7) allows selectively dropping the air-cargo (43) at different altitudes, which may be selected from 5 to 20,000 m, from 10 to 5,000 m, from 25 to 2,500 m, from 50 to 1,000 m, from 75 m to 2,500, or from 100 m to 1,000 m. The ejection system (7) is preferably configured to drop the air-cargo (43) so that the same falls in a substantially vertical direction before landing.

The system of the present invention may also comprise a loading system (6) that is able to load the air-cargos (43) into the aircraft. Preferably, the loading system (6) is configured to load the air-cargos (43) in a specific order based on the air-drop delivery projected path and travel information. A loading system (6) may comprise a device to read a label attached to the air-cargo (43), to send a signal to the computing system with a label information (3) and to process an instruction from the computing system (3) that, based on the fulfillment information and/or travel information, determines the position of the air-cargo (43) within the aircraft (5). A loading system (6) may comprise conveying devices for conveying at least one air-cargo (43) onto a loading deck of the aircraft (5). The air-cargo (43) may be loaded onto the aircraft (5) based on the loading instruction received from the computing system (3). The loading system (6) may also comprise lifting equipment such as a fork lift, a conveyor system or combinations thereof. The loading system (6) may comprise manual loading and in certain embodiments, the loading of the air-cargos (43) may be made manually.

The system of the invention may not require a loading system (6) since in certain embodiments the air-cargo (43) may be loaded without the need of a loading system (6).

Landing Assisting System and Path Guidance System

Different methods and systems can be used to "deliver" the air-cargo so that it can be collected within the target drop zone. In this sense, in order to achieve successful air drop delivery of the at least one air-cargo into at least one target drop zone, the system of the invention comprises at least one of a landing assisting system (9) or a path guidance system (10).

A landing assisting system (9) according to the invention is a system that provides at least one of the following: a lower impact landing or softer landing of the air cargos, or that allows a speed reduction for the falling air-cargos (43), with the target of avoiding considerable damage of the landing air-cargos (43). A landing assisting system (9) may be positioned in at least one of the drop zone (8) or in the air-cargo (43). The at least one landing assisting system (9) according to the present invention is selected from the group comprising a net receiving system (91), a landing surface cushion system (92), a speed reduction system (93), a shock absorption system (94), or an air-cargo protection system (95). On the other hand, a path guidance system (10) according to the invention is a system that provides guidance to the air-cargos (43) so that they fall within a specific zone, and allows reducing the dispersion of the falling air-cargos (43). A path guidance system (10) according to the invention is selected from a guidance system (101) and a steering system (102).

In this line, it's important to understand that when an air-cargo is dropped from the air by itself, its falling velocity will increase until it reaches a steady fall velocity called the "terminal velocity". The terminal velocity can be calculated based on the mass of the object (m in kg), cross sectional area (A in m$^2$), drag coefficient (related to the geometry of the object), medium density ($\rho$ in kg/m$^3$) of the fluid through which the object is falling, and its acceleration due to gravity (g in m/s$^2$). As a simplified formula, the following can be used to calculate terminal velocity:

$$\text{Terminal Velocity} = \frac{2 \times m \times g}{p \times A \times C}$$

When an air-cargo package is dropped from an aircraft, it is likely that the package never reaches the terminal velocity, since the package will touch ground (land) before it achieves its terminal velocity. However, depending on the time the package is falling, it may reach terminal velocity. For example, a package being dropped from 5,000 ft that falls for about seconds, can reach about 75% of its maximum terminal speed before it lands. If the package is on the air longer while falling, it may reach its terminal velocity before touching the ground.

The resulting landing velocity of the air-cargo, in a simplified way, will ultimately mainly depend on the ejection height (height at which the air-cargo is ejected from the aircraft), the weight of the air-cargo, the drag coefficient of the air-cargo, and if any systems, materials, equipment, or configurations are used that may affect its falling speed (such as a landing assisting system or a path guidance system, among others), where such factors will affect the resulting landing velocity. In regards to the drag coefficient, it's important to note that such drag coefficient will depend on the resistance the air-cargo has against the wind. Therefore, it is very important to consider at least one of a landing assisting system or a path guidance system as part of the low capital and operation cost logistics system from the present invention, which allows reducing and minimizing damage to the air-cargos that may influence the functionality of such air-cargos.

According to the invention, it is considered that an air-cargo (43) is considerably damaged when most of its contents suffer a physical damage that affect their functional purpose. In a preferred embodiment, air-cargo damage is allowed if at least 90% of the products from an air-cargo (43), which use a landing assisting system (9) or a path guidance system (10) maintain their usage functionality. More preferably, it cargo damage is allowed if at least 98% of the products from an air-cargo (43), which use a landing assisting system or a path guidance system maintain their usage functionality. Examples of cargo damage include water damage, weather damage, or impact damage that affects the aesthetic and/or functional purposes of the e-commerce merchandise.

Net Receiving System

In an embodiment of the invention, the landing assisting system (9) is a net receiving system (91) that is deployed at least in one drop zone, and is able to receive the air-cargos (43) and provide support during their landing previous to collecting the air-cargo (43) from such net receiving system (91).

The net receiving system (91) generally comprises at least one flexible net (911) or flexible sheet (912) material, where the dimensions and specifications of the flexible net (911) or flexible sheet (912) material and its receiving surface area depends on the drop zone location, estimated amount of packages that such net receiving system (91) is able to process, climate conditions, if the use is temporary or permanent, landing error calculations, configurations, installation angles, and overall area needed to receive the air-cargos (43) falling from the sky. The net receiving system (91) has a surface of at least about 50 m2, or at least 200 m2, or at least 500 m2, at least 1,000 m2, or at least 10,000 m2, or at least 40,000 m2. The net receiving system (91) can have different shapes and configurations. In an embodiment of the invention, the net receiving system (91) includes a combination of a flexible net (911) and flexible sheet (912) material.

In an embodiment of the invention, the at least one flexible net (911) or flexible sheet (912) material is held by a poles system (913) placed on the ground of the drop zone. The materials and configuration of the poles system (913) are defined based on the type of air-cargos they will be receiving (including weight, volumes, and shape among others), and type of net receiving system (91) used and configuration, as well as fall velocities, weather conditions of the site where the poles system (913) is located or installed, resistance to damage, shock absorption, among others. In an embodiment of the invention, the material of the poles system (913) is aluminum or steel. Embodiments of the poles system (913) include using truss, column beams, tubes, having different shapes and cross sections.

The net receiving system (91) according to the present invention has an air-cargo receiving capacity depending on the size and volume of the packages or air-cargos (43). In an embodiment of the invention, for multibox packages with dimensions of 40 cm×40 cm×40 cm, the air-cargo (43) receiving capacity is at of at least 10 packages or air-cargos (43) per hour, or at least 100 packages per hour, or at least 200 packages per hour. Depending on the type, configuration, and size of the packages, such receiving capacity can change to accommodate the size and configuration of the air-cargos (43).

It will be appreciated by one skilled in the art that different flexible net (911) or flexible sheet (912) materials and configurations may be used, as well as different types, configurations, and materials for the pole system, which will depend on the structural analysis and integrity of the net receiving system (91) for each specific drop zone.

In an embodiment of the invention, the flexible net (911) is a fabric, textile, or material that is looped, attached, or knitted, twisted, or knotted so that it creates intersections and therefore creates a breathable mesh pattern. Generally speaking, a net is an open mesh pattern. Mesh patterns can have shapes like squares, hexagonal shapes, or octagonal shapes, among others. In the case of using a flexible net (911), the mesh size and parameters of the net materials are defined based on the type of air-cargos (43) they will be receiving (including weight, volumes, and shape among others), fall velocities, weather conditions of the site where the flexible net (911) is located or installed, resistance to damage, and/or shock absorption, so the flexible net (911) is able to withstand a minimum test force or impact. In an embodiment of the invention, the peak of the impact from air-cargos (43) and/or packages falling into the net receiving system (91) is less than 10G.

Parameters defined for the flexible net (911) include the fiber material, mesh size, mesh type, cord diameter, mesh break, strength, fire resistance needs, endurance over time, duty cycles, UV protection, border options, among others. In an embodiment of the invention, the mesh size is between 1 and 24 inches.

The flexible net (911) materials are selected from the group comprising fibers including silk, polyester, nylon, materials including fabrics, ropes, yarn, elastane, plastics, and combinations thereof. In an embodiment of the invention, the flexible net (911) is a hand-built net, with custom woven.

In an embodiment of the invention, the flexible sheet (912) is selected from the group comprising materials including plastics, rubbers, fabrics, paper, non-reticulated materials and combinations thereof.

In another embodiment of the invention net receiving system (91) comprises a combination of a flexible sheet (912) and a flexible net (911).

Figure 7:
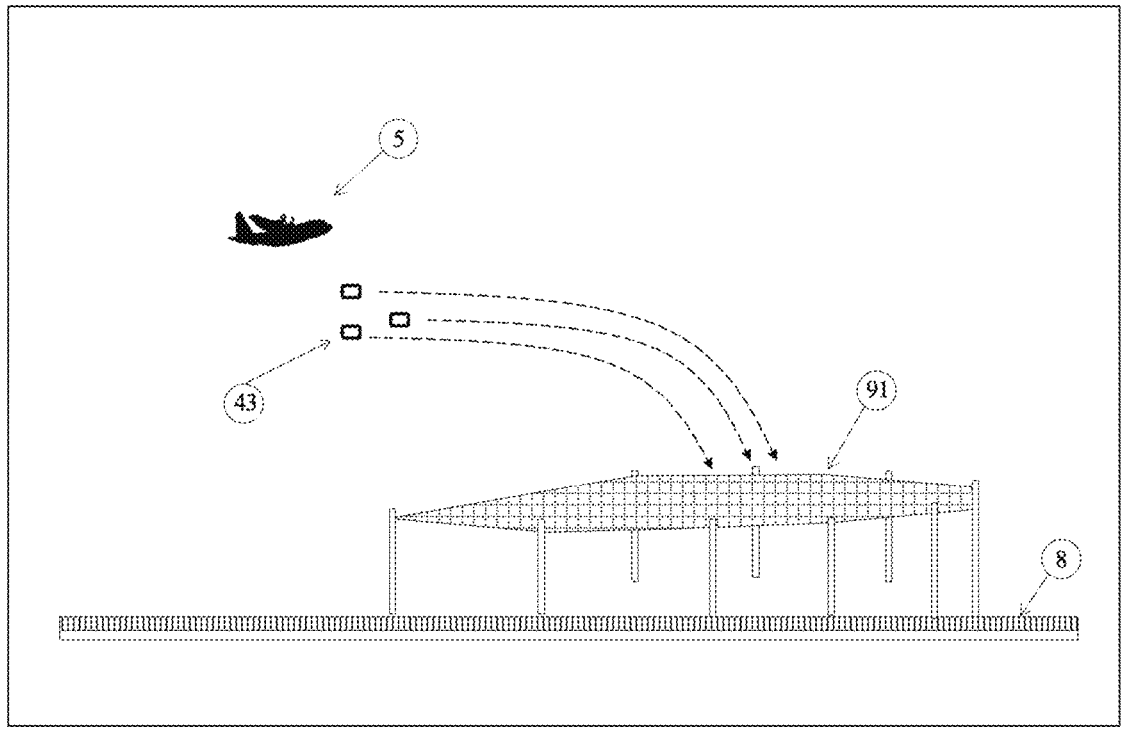
FIG. 7 shows a schematic representation of a preferred embodiment of the present invention, where an aircraft (5) ejects multiple air-cargo (43) so that such air-cargo is received by a net receiving system (91) located within a drop zone (8).
Figure 8:
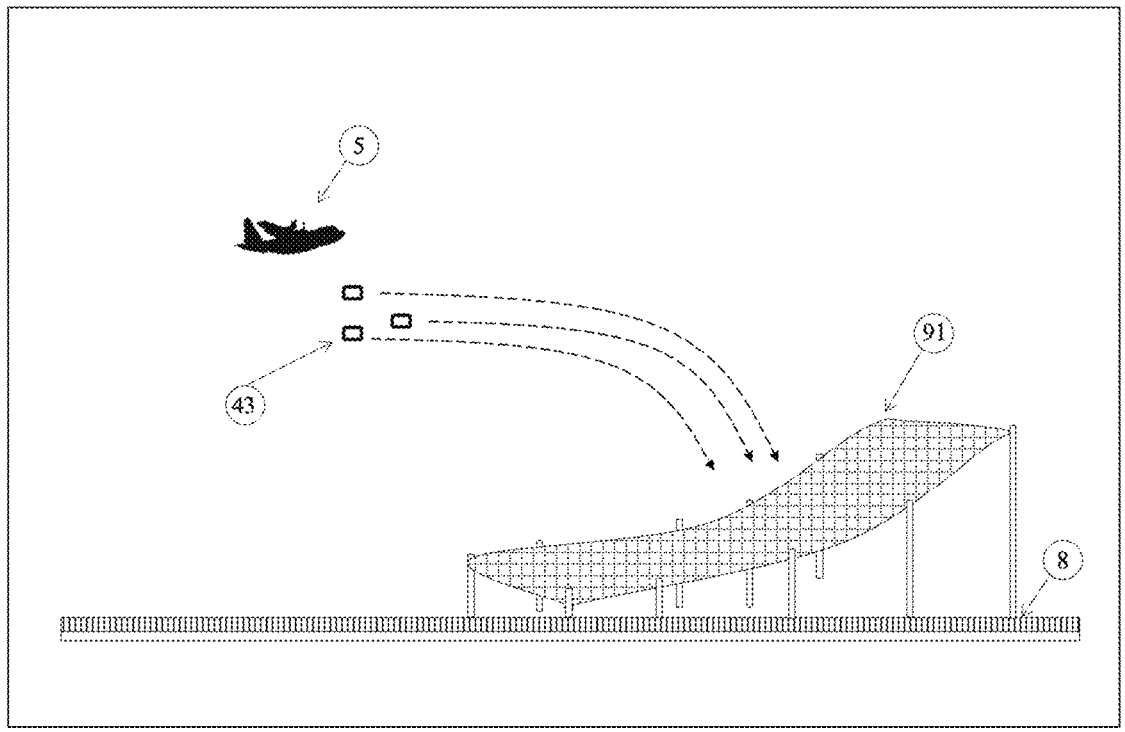
FIG. 8 shows a schematic representation of an embodiment of the present invention, where an aircraft (5) ejects multiple air-cargo (43) so that such air-cargo is received by a net receiving system (91) located within a drop zone (8).
Figure 9:
FIG. 9 shows a schematic representation of an embodiment of the present invention showing a referential map of continental U.S. where air drop delivery is performed through aircraft that takes off from at least one Central Fulfillment Center airport or related airport, where the air-drop delivery aircraft delivers cargo through air-drop in a 500 km radius from the Central Fulfillment Center.

As it can be seen in Figure 1and FIG. 8, the net receiving system (91) is located within a drop zone (8), and can have different configurations for receiving the falling air-cargos (43) that have been air-dropped from moving aircraft. FIG. 7 shows a substantially horizontal net receiving system (91), whereas FIG. 8 shows a curved net receiving system (91).

In an embodiment of the invention, at least one impact assist system (914) may be used in connection with the net receiving system (91), which is selected from the group comprising equipment, devices, or systems that can be located in at least one section of the flexible net (911) or flexible sheet (912) to reduce the velocity of the falling air-cargos (43) such as height regulation systems (914a) that allow to adjust the height of the poles system (913) or the flexible net (911) or flexible sheet (912) depending on the velocity and weight of the impact, anchoring points (914b), pulley systems (914c), or affixing systems, force dissipation devices (914d), deceleration systems (915e), and combinations thereof.

Alternative Embodiments of the Landing Assisting System

Landing Surface Cushion System

In an embodiment of the invention, the landing assisting system (9) comprises a landing surface cushion system (92), which is provided on the landing surface of at least part of the drop zone to receive falling packages and provide a softer landing or reducing impact to the air-cargos (43). A landing surface cushion system (92) comprises materials selected from the group comprising rubber materials, plastic materials, cardboard or paper materials and configurations, bubble wraps or air pillows, pellet materials, polystyrene, foam materials and structures, fiberboard materials, inflated products, suspension cushions, rubberized fiber materials, cork materials, and combinations thereof Speed Reduction System In another embodiment of the invention, the landing assisting system (9) comprises a speed reduction system (93) which allows to reduce the falling speed of the air-cargos (43) before they reach the drop zone. A speed reduction system (93) according to the invention is selected from the group comprising a balloon system (931), a parachute system (932), an unmanned drone system (933) and others systems (934).

A balloon system (931) according to the invention allows to slow down the fall velocity of the air-cargos (43). A balloon system may be filled with a gas that is lighter than air, which is decompressed after ejection, and therefore provides buoyancy to the air-cargo.

A parachute system (932) according to the invention allows to considerably increase the drag coefficient from such air-cargo and therefore allows to reduce falling speed and landing speed of the air-cargo. In an embodiment, the air-cargo comprises parachute affixing means for affixing a parachute system. Such parachute systems can be re-usable or may be a one-time use system. The parachute system is designed and configured to decrease the velocity of the air-cargo after it is deployed from the aircraft as it falls by gravity to the selected drop zone area. Such parachute system is preferably configured to provide a landing speed of less than 25 m/s. Additionally, such parachute systems can comprise non-guided and guided parachute systems, which are able to ensure proper landing within a designated drop zone. Guided parachute systems comprise elements and equipment such as fins, GPS guided mechanisms, robotic systems, among others. Some technical features of parachute systems suitable for the present invention comprise parachute systems that can be dropped from manned aircraft, which allow pallet, platform, or container deliveries, that have robotic guiding systems to achieve better landing precision, preferably with precisions of between 20 to 500 meters (although wider ranges can be used depending on the parachute type, the type of load being dropped, and characteristics of the drop zone), which allows cargo loads of more than 100 kgs, more than kgs, and even over 1,000 kgs or more as an average, and that can be dropped from altitudes of up to 35,000 feet. Systems that direct the parachutes to pre-defined targets on land with less than 50 meters of error may also be included. This allows drop zones (8) to be located near or inside the cities without requiring expansive landing areas for the air-cargo.

An unmanned drone system (933) comprises a system that is deployed from the aircraft during flight, and includes systems and delivery vehicles with wings and guidance systems to deliver the air-cargo to the target drop zone.

Shock Absorption System

In yet another embodiment of the invention, the landing assisting system (9) comprises a shock absorption system (94) which provides a softer landing and can minimize damage to the air-cargo contents caused by landing within the drop zone. Such shock-absorption system can be a part of or can be affixed into the air-cargo, in a manner that it allows absorbing a part of the shock force that the air-cargo is subject to when it lands at a certain speed. In an embodiment of the invention, the shock-absorption system (94) comprises light materials (941) or inflatable materials (942) or mixtures thereof. The shock-absorption system may comprise systems such as double-wall or double-bottom systems that can be hollow or that additionally can be filled with air or shock-absorption materials such as fabric, wool, cotton, cardboard, crushable fillings, fluids, soft pellets and materials, among others.

Air-Cargo Protection System

In a further embodiment of the invention, the landing assisting system (9) comprises an air-cargo protection system (95), which uses materials attached to or built into at least part of the outer surfaces of the air-cargos (43), where such materials can be selected from the group comprising rubber materials, plastic materials, cardboard or paper materials, bubble wraps or air pillows, pellet materials, polystyrene, foam materials and structures, fiberboard materials, inflated products, suspension cushions, rubberized fiber materials, cork materials, among others.

Path Guidance System 10

A path guidance system (10) according to the invention is a system that provides guidance to the air-cargos (43) so that they fall within a specific zone, or that allows a reduction in the dispersion of the falling air-cargos. A path guidance system (10) according to the invention is selected from a guide system (101) and a steering system (102). The path guidance system (10) may ultimately allow for smaller drop zones (8), or smaller net receiving systems (91), or smaller landing surface cushion systems, among others. Thereby, by using a path guidance system, the net receiving system (91) or landing surface cushion system (92) can be designed to minimize footprint of the receiving area for the falling air-cargos (43).

A guide system (101) according to the invention may provide guidance to the air cargos so they fall within a specific area or range, or to decrease the dispersion of falling packages. A guide system (101) according to the invention comprises systems that are affixed to the air-drop delivery aircraft, including as pulley systems (101*a*), cable systems (101*b*), tube systems (101*c*), and combinations thereof. Pulley systems (101*a*) may achieve lowering the air-cargos (43) from the aircraft in a more controlled manner, by having pulleys that allow hanging the air-cargos (43) from the aircraft before delivery. Cable systems (101*b*) may allow to hang the air cargos and drag them, while it is necessary, before detaching the cable system (101*b*) from the air-cargo for delivery of such air-cargo to the drop zone. Cable systems (101*b*) may also connect a set of air-cargos (43) that are dropped simultaneously or almost simultaneously, which lowers the landing dispersion of the air-cargos (43).

A steering system (102) according to the invention may be used to adjust the course of the air dropped air-cargo or to provide navigation tithe air dropped air-cargo so that it falls within its designated drop zone. In an embodiment of the invention, such a steering system (102) is attached, affixed, or adjoined to the air-cargos (43) to provide for navigation and minimizing deviations from a main falling path of the air-cargos (43). A steering system (102) is selected from the group comprising equipment that produces thrust (102*a*) and equipment that rotates (102*b*) to minimize deviations from a main falling path. A steering system (102) is also selected from equipment that allow the air dropped air-cargo to be directed to a specified drop location. In another embodiment of the invention, a steering system (102) comprises fins (102*c*).

Drop Zones (8)

As mentioned above, the air-cargos (43) are air dropped to target drop zones (8) through the use of aircraft (5) that ejects the air-cargos (43) during flight, without the need of landing at such drop zone, so the air-cargo (43) lands on such target drop zones (8) or on a landing assisting system (9) positioned within that zone (8). Drop zones (8) are preferably strategically localized near the consumers.

The drop zones (8) generally refer to the locations that are defined and configured to receive falling air-cargos (43) that are dropped from air-drop suitable aircraft. These drop zones (8) may be orders of magnitude less costly than comparable fulfillment centers, as previously described. More specifically, rather than being a massive, expensive building, the drop zones need to be arranged and configured to receive the air-cargo (43) dropped by the aircraft and allow for the collection of such air-cargos (43). The air-cargos (43) may be dropped in the drop zones locations without the need of landing, even in small cities or villages where packages normally take long time to arrive under current delivery systems and methods.

For reference, as defined by the U.S. Census, Urbanized Areas (UAs) are continuously built areas with a population of 50,000 or more, Urban Places (UPs) outside of Urban Areas are any incorporated place with at least 2,500 inhabitants, and Rural Places (RPs) are any incorporated places with fewer than 2,500 inhabitants and located outside of Urban Areas. As used herein, rural areas refer to geographic areas that are located outside urban areas such as towns or cities, where urban areas have high population densities, and built infrastructure.

The drop zone (8) areas are preferably located near urban areas or even inside urban areas. Large cities or urban areas may have drop zones (8) in different locations of the city, near the consumers, allowing delivery times not possible with the traditional logistics. The drop zones (8) may be defined to be close to the end consumers, near big cities, or even near small towns, generating a very high delivery range and also allows for fast delivery in areas that are difficult to reach by traditional shipping means without the need of landing or long track routes, creating cost and time advantages over traditional cargo delivery systems.

Drop zones (8) are generally located near the consumers, and preferably may be located not more than 100 kilometers in average from consumers, where consumers may be located in rural areas, or urban areas as previously defined. More preferably, drop zones may be located not more than 50 kilometers in average from consumers. In an embodiment of the invention and under certain conditions, drop zones may be located in urban areas and within the cities.

Drop zones may be generally selected from farms, green areas, locations within rural areas, vacant areas, fields, and/or land extensions that have been temporarily or permanently authorized for landing of air-cargo (43). Drop zones (8) may be located in the surroundings of big cities, or even within big cities. Urban areas may have a plurality of drop zones located in different areas of the city to facilitate the final delivery near the consumer, such as stadiums, arenas, rooftop planar surfaces, parks, racing fields, sport venues, among others. In some embodiments of the invention, drop zones (8) may be located over water, like lakes, lagoons, rivers, or the sea. Also, existing small aerodromes for light aircraft can be used as drop zones (8), and in other embodiments the surroundings of aerodromes may be used as drop zones (8) as well.

It is also important to consider that the drop zones (8) may need to be configured to consider potential landing errors related to air dropping of air-cargo (43) within drop zones (8). The aircraft may need to drop the air-cargo (43) while flying over, in the vicinity, or near the target drop zone, so that the air-cargos (43) fall within the drop zones (8). Drop zones (8) may be equipped with a landmark, a lighting fixture or an illumination system to provide visible signals or light signals to the aircraft and facilitate the positioning of the aircraft before the air-drop ejection.

Drop zones (8) may preferably support and allow the use of net receiving systems (91) or landing surface cushion systems to receive the air-cargos (43) dropped from the moving aircraft. Drop zones (8) may incorporate an air-cargo retrieval system (81) that facilitates the retrieval of the air-cargo (43) from the drop zone (8). In an embodiment of the invention, when a net receiving system (91) or a landing surface cushion system (92) is provided in the drop zone, an air-cargo retrieval system is used. An air-cargo retrieval system (81) may be selected from the group comprising manipulator arms, vacuum lifters, mobile lifters, cranes, fork lifts and combinations thereof, among other equipment or system that facilitates recovery of air-cargos (43).

In a preferred embodiment of the invention, the air-cargos are dropped so that they fall within the preferred net receiving system located within the drop zones. As previously described, in a preferred embodiment of the invention, a net receiving system is deployed in the drop zones, which allows to receive and collect the air-cargos that have been air-dropped. Based on the above, it is important to know that the drop zone location, the aircraft flying velocity, the environmental conditions (like wind speed and wind direction, among others), and other factors are considered before ejecting the air-cargo, and are used to determine a distance range, speed, and height of where the aircraft ejects the air-cargo so that it lands within the target drop zone, and preferably so that it lands within the net receiving system.

As mentioned previously, in embodiments of the invention, the aircraft may perform circular paths in order to reach the same or nearby drop zone locations within the same trip, depending on the number and type of air-cargos (43) that need to be delivered to a specific drop zone. This is even more relevant for drop zones (8) that have a limited rate of receiving air-cargo packages, or also in situations where the amount of packages to be dropped from the plane surpasses the time where the aircraft can make the air-drop delivery in order for the packages to effectively fall within such drop zone or within a landing assisting system (9) within such drop zone.

In an embodiment of the invention, the system also comprises an apparatus for collection of the air-cargo that has landed in the drop zones (8). In a preferred embodiment where a net receiving system is deployed in the drop zone to receive falling packages, such packages are then collected from the net receiving system (91) to prepare and allow the net receiving system to receive more packages.

Delivery System (15)

In an embodiment of the invention, the system may comprise a delivery system (15) so that the merchandise from the air-cargo may be delivered to the consumer by a number of different systems as previously described as the last mile delivery. For example, delivery systems and companies, such as FedEx®, UPS®, USPS®, rideshare companies like Uber, own-transportation systems, local couriers, service partners, among others may be used. In certain embodiments, delivery to the consumer may require sending the air-cargo collected from the drop zone into an outbound sorting center, before it is transported to the consumer. In an embodiment of the invention, air-cargos (43) may be sent from one outbound sorting center or drop zone to other drop zones (8) located in the same city or area, through aircrafts or drones without the need of landing in order to avoid traffic problems.

In an embodiment of the invention, the system comprises an outbound sorting center (14) that receives the air-cargo or packages collected at the drop zone or from other locations, so as to sort and classify the merchandise within the air-cargo, before delivery to the consumer through last mile delivery processes.

Figure 10:
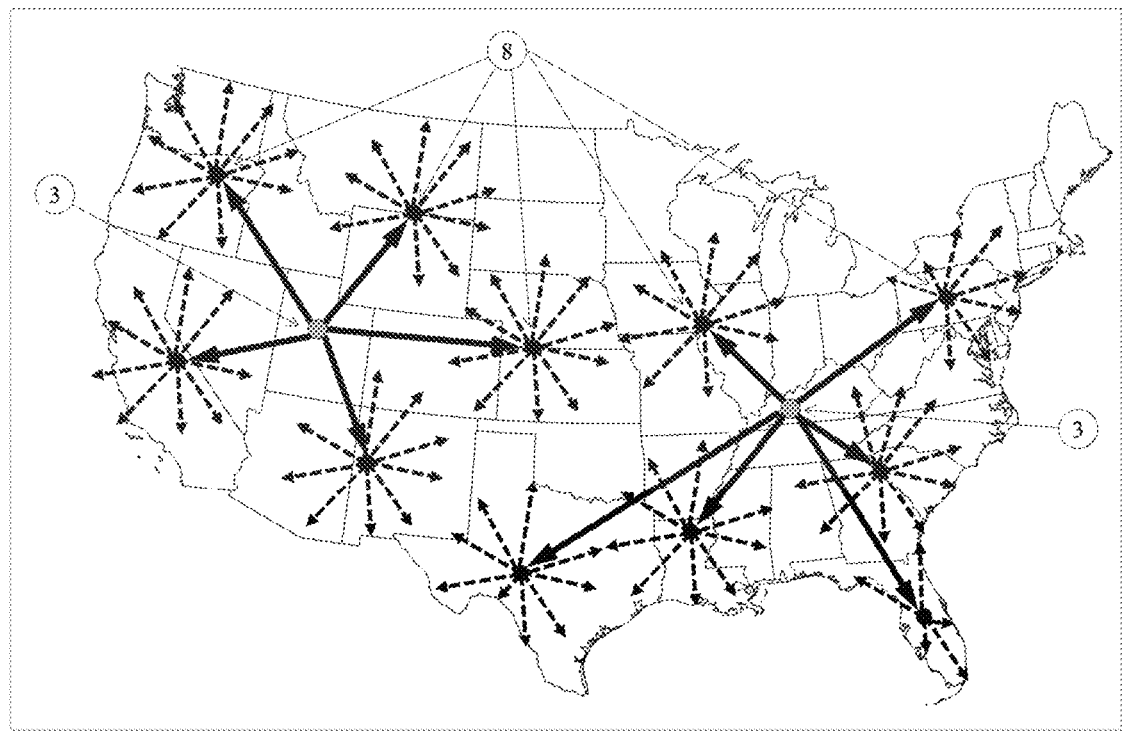
FIG. 10 shows an schematic representation of an embodiment of the present invention showing a referential map of continental U.S., wherein the logistics system and method comprises the use of a Transfer airport (12), where the assembled air-cargos (43) or the e-commerce merchandise that has yet to be assembled as an air-cargo (43) are transported from at least one Central Fulfillment Center to at least one Transfer airport (12), and afterwards the air cargo is delivered through air-drop delivery aircraft within 500 km radius from the Transfer airport (12).

For example, FIG. 10 illustrates a schematic U.S. map showing an embodiment of the invention where only two Central Fulfillment Centers are strategically placed to achieve short delivery timeframes of the e-commerce merchandise stored in such Fulfillment Centers. Accordingly, it will be appreciated that by having a relatively small number of CFCs, the need for a large infrastructure of fulfillment centers is eliminated. FIG. 10, shows that only two placed CFCs, one located near Salt Lake City, Utah, and the other near Nashville, Tenn. FIG. 10 shows that, for example, with only 2 Central Fulfillment centers, air-drop delivery can be performed directly from these CFCs with the system described previously, using air-drop delivery aircraft in a radius of up to 500 km or even more for this purpose.

As another example, by using the present invention in Europe, and having one fulfillment center in Germany, it may take less than 45 minutes to reach every part of that country—and could cover other European countries such as France, the UK, Italy, Belgium, the Netherlands, Austria, and others within 2 hours or less. Thus, with just one Central Fulfillment Center, most of Europe could be reached in less than 3 hours.

The method and system from the present invention therefore avoids having to storing the goods in huge and multiple warehouses near many cities, only requiring to ship what's being ordered online from one or few CFCs that are strategically located. Current logistics system may not achieve a same day delivery in such small cities or rural areas. It is important to note that as a result of shipping and delivery logistics systems, the total cost of a package for its fulfillment and delivery in such short time will be lower than for current leading de-centralized logistics systems and methods.

It is important to mention that the system and method from the present invention also allows for the fast delivery of a huge amount of fresh items and groceries that with current delivery systems it would not be possible to deliver, since current systems can only deliver a small variety based on the available stock of fresh products (in nearby retail stores or supermarkets). For example, Amazon purchased the supermarket chain Wholefoods for more than USD$13 billion to allow having a large number of warehouses with fresh products to achieve deliveries of fresh products closer to the consumers. On the other hand, the present invention allows to perform delivery of a huge selection of fresh items in a short timeframe by requiring one or a few fulfillment centers that store the fresh products and that can be delivered in short times to high-density urban centers or other rural areas, or areas outside of main cities. The systems and methods of the present invention not only allow for the fast delivery of typical e-commerce merchandise, but also for fresh products and groceries, as well as niche products that can be stored in the CFCs and therefore readily available for the niche market consumers.

Low Capital and Operation Cost Logistics Method of the Present Invention

The present invention also provides a low capital and operation cost logistics method that allows for the fast and massive delivery of e-commerce merchandise in an extensive geographical area.

The method of the present invention comprises the use of a computing system (3) that receives fulfillment information of an order for e-commerce merchandise placed online through at least one online shopping platform. When a consumer places an online order for e-commerce merchandise through at least one online shopping platform, such platform provides instructions and/or information to at least one computing system, comprising fulfillment information from such order. The computing system from the present invention is configured to be in network connection with the Central Fulfillment Center, which allows to determine which product has been purchased, what quantity, and its final shipping and/or delivery address. Using input from the computing system, the merchandise is then selected, sorted, and packaged at the CFC.

The computing system used in the method from the present invention (3) is capable of receiving a high volume of online fulfillment orders at least 10,000 orders per day or fulfillment information associated to such orders and that is in network connection or communication with at least one Central Fulfillment Center (CFC) 2, the at least one CFC having a surface of at least 5,000 m2 and a height of at least 2 m, or at least 3 m, and the CFC being located at a distance of no more than 50 km from a runway facility for the take-off and/or landing of a manned aircraft.

Sorting and Preparing the Packages or Air-Cargos

The method of the invention further comprises sorting and preparing the e-commerce merchandise into packages as part of at least one multibox package, individual package, or air-cargo that is suitable for air-drop, based on the fulfillment information received by the computing system. The packages part of the air-cargo comprise individual packages, multibox packages, or a combination thereof. The sorting and preparing of the products and packages takes place at the at least one CFC. The method comprises sorting and preparing the orders into individual and/or multibox packages or combinations thereof, and wherein the packages are shipped as part of at least one air-cargo that is suitable for air-drop based on the fulfillment information received by the computing system. The sorting of products and orders may be done by grouping several orders from different consumers or that need to be delivered to different addresses within the same destination zones, achieving considerable environmental advantages and cost savings.

Preferably, the packages are organized as air-cargos (43) according to the travel route and corresponding target drop zones (8) based on the destination of such air cargos. In a preferred embodiment of the invention, the air-cargos are sorted so that the air-drop suitable aircraft is loaded at a high capacity given the volume and/or weight of the packages or air-cargos, and so that it makes several drops of air-cargos (43) before landing.

The method of the invention further comprises loading the at least one air-cargo into a manned air drop delivery aircraft configured to carry a total air-cargo load of at least 2,000 kgs in average and is able to fly at a speed of at least 200 km/h, according to the chosen delivery path. Optionally, if the distance from the at least one drop zone to the CFC is more than 300 km, at least one transfer airport (12) is utilized to distribute the assembled air-cargos (43) or the e-commerce merchandise in individual or multibox packages that is yet to be assembled as an air-cargo (43), from the CFC to the transfer airport (12) previous to air-drop delivery. In such case, wherein a transfer airport is used, the air-cargos are loaded into a manned air-drop delivery aircraft after passing through the transfer airport. In an embodiment of the invention, the merchandise is transported as individual packages or multibox packages, or combinations thereof into a transfer airport, from where it assembled as air-cargos suitable for air-drop deliveries, before loading such air-cargos into the air-drop delivery aircraft.

Air-Drop Delivery

The method of the invention further comprises air-dropping at least one air-cargo (43) into at least one drop zone (8) based on the destination of the e-commerce merchandise within the air-cargo, the air-cargo being dropped from the aircraft during flight to allow the air-cargo to land within at least one drop zone located at least 150 km from the CFC or transfer airport. Dropping the air-cargo can be performed at different altitudes of between 5 m and 20,000 m and at different speeds, depending on the type of aircraft, environmental or weather conditions, type of landing assisting system or a path guidance system used, regulatory requirements, or safety requirements, among others.

The method of the invention further comprises providing at least one of a landing assisting system or a path guidance system as previously described. In a preferred embodiment of the invention, the air-cargo (43) is dropped so that the at least one air-cargo falls within its target drop zone (8).

In a preferred embodiment of the invention, the method comprises providing a landing assisting system that comprises a net receiving system that is at least partially located within a drop zone. In such preferred embodiment of the invention, a net receiving system (91) is deployed in the drop zone (8), which allows to receive the air-cargos (43) that have been air-dropped.

The drop zones (8), the aircraft (5), the aircraft flying velocity, the environmental conditions (like wind speed and wind direction, among others), and landing assisting system or a path guidance system used in connection with the method of the present invention are carefully considered before ejecting the air-cargo, and are used to determine a distance range, speed, and height of where the aircraft ejects the air-cargo so that it lands within the target drop zone.

In an embodiment of the invention, the aircraft departs from a departure airport and then preferably lands in the same departure airport, without the need of landing in intermediate airports. During the flight, the aircraft may deliver many air-cargos (43) in different drop zones (8) making a very efficient delivery system without the need for use of commercial airports and achieving delivery times.

The method of the invention further comprises receiving the air-cargo in at least one drop zone, wherein the air-cargo falls within the drop zones (8) or within a landing assisting system used as part of the drop zone. The method of the present invention also requires collecting the air-cargos from their receiving surface within their target drop zone.

Delivery to Consumer

The method of the invention further comprises delivering the e-commerce merchandise directly to the consumer or to an outbound sorting center (14) which delivers the e-commerce merchandise to the consumer, wherein either can utilize last mile a delivery system (15).

Figure 11:
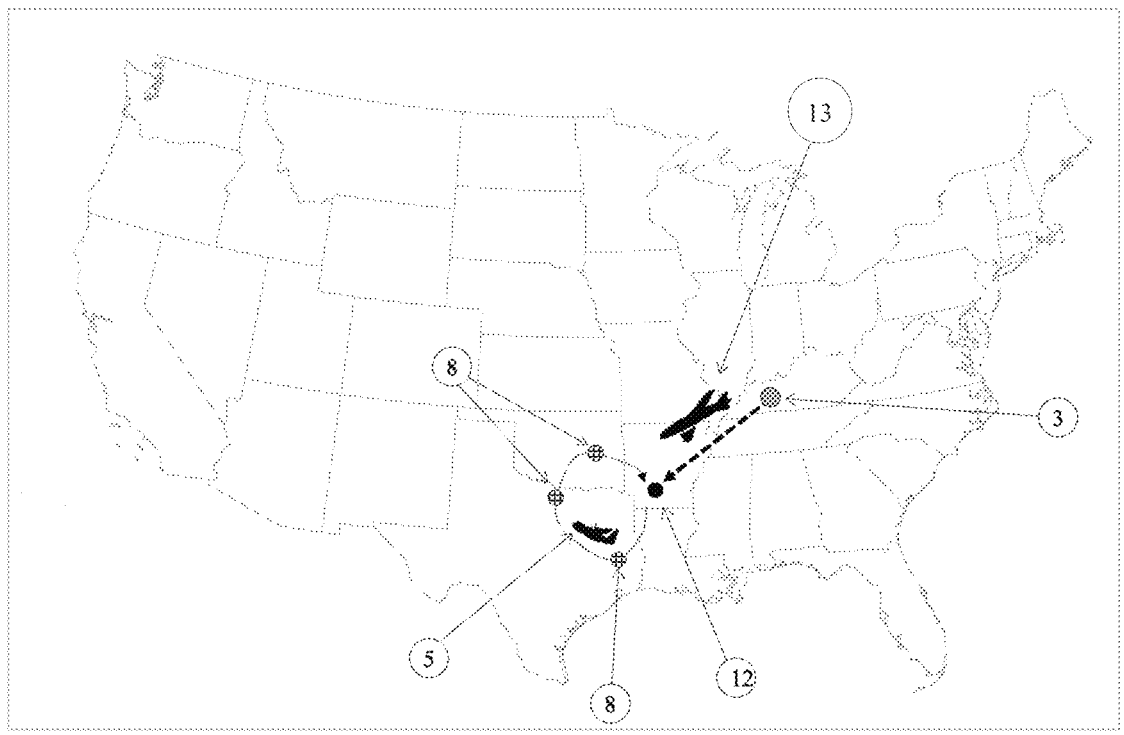
FIG. 11 shows a schematic representation of an embodiment of the present invention, showing a referential map of continental U.S., showing one CFC 3 from where a transfer aircraft (5) ships air-cargo from the CFC to a sorting airport 12, from where an air-drop delivery aircraft (5) departs in order to deliver air-cargos (43) during flight to at least one drop zone (8) within its travel route.
Figure 12:
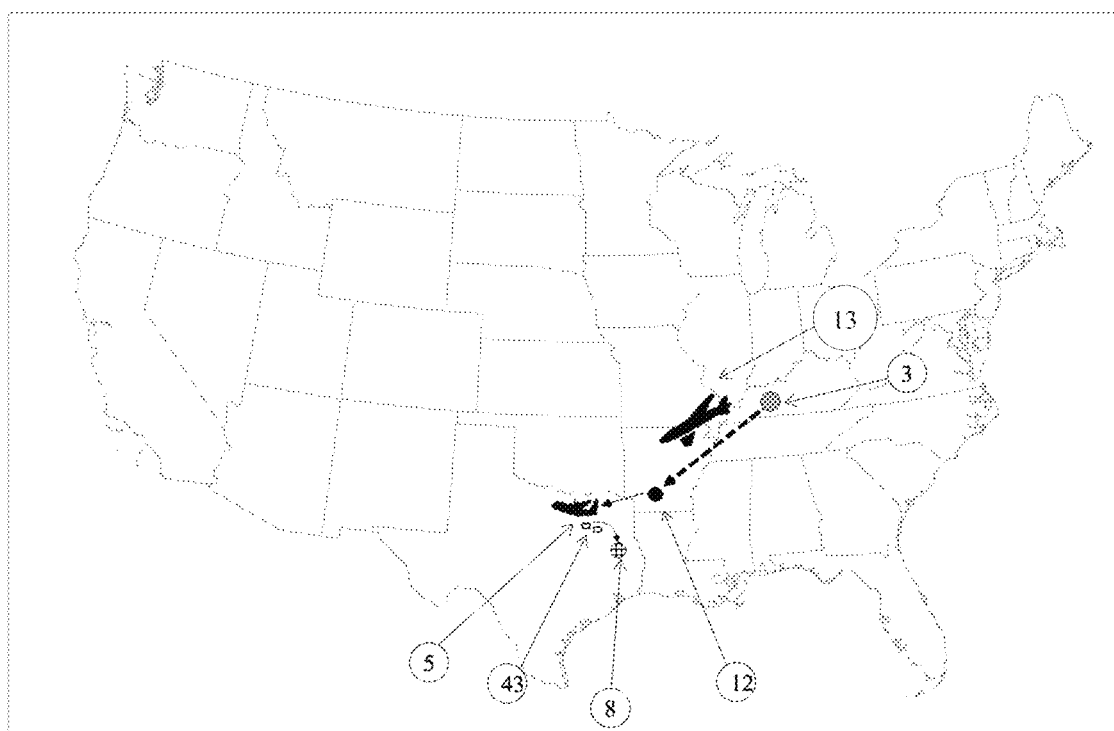
FIG. 12 shows a schematic representation of an embodiment of the present invention, showing a section of a referential map of continental U.S., showing one CFC 3 from where a transfer aircraft (5) ships e-commerce merchandise from the CFC 3 to a sorting airport 12, from where an air-drop delivery aircraft (5) departs in order to deliver air-cargos (43) during flight to at least one drop zone (8).
Figure 15:
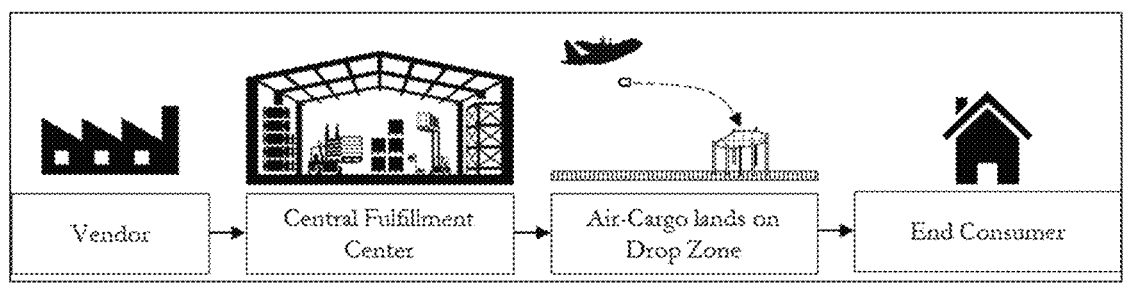
FIG. 15 shows a simplified schematic of the present invention's low capital and operation cost logistics systems for fast delivery of products to consumers, where the air cargo is collected from the drop zone and shipped to the consumer through last mile delivery processes.
Figure 16:
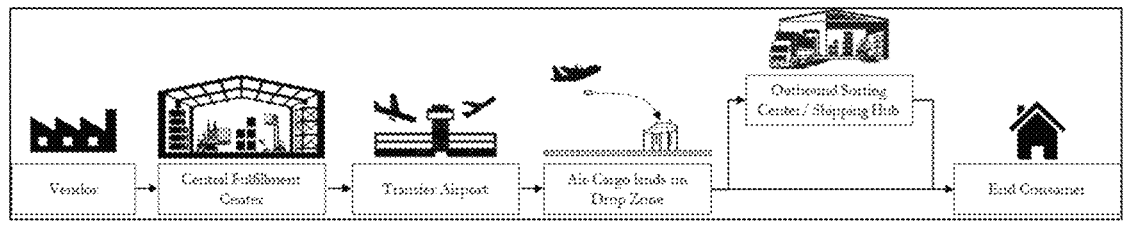
FIG. 16 shows a simplified schematic of an embodiment of the present invention's low capital and operation cost logistics systems for fast delivery of products to consumers, where the assembled air-cargo (43) or the e-commerce merchandise that is yet to be assembled as an air-cargo (43) is transported from a Central Fulfillment Center to a Transfer airport (12) prior to the air-drop delivery process, and afterwards the air-cargos (43) are collected from the drop zone and shipped to the consumer directly through last mile delivery processes, or passing through an outbound sorting center prior to the last mile delivery process.

A referential schematic of the present invention can be seen in FIG. 11 FIG. 12 where the present invention may not require the use of multiple fulfillment centers and only uses one or a few Central Fulfillment Centers that carry the merchandise that is sold by at least one online shopping platform. The air-cargo is dropped from an aircraft during flight so that it falls and lands on a target drop zone. In an embodiment of the invention, as shown in FIG. 15, the air-cargo is collected and shipped directly to the consumer through last mile delivery processes. In another embodiment of the invention, as shown in FIG. 16, the air-cargo is collected, and then sent to an outbound sorting center before delivering the products contained within the air-cargo to the consumer. Therefore, the present invention may comprise an outbound sorting system for the e-commerce merchandise within the air-cargo.

The last mile delivery process may be preferably performed from the drop zone, where, as previously described, rideshare companies may be used, such as Postmates, Amazon Flex, UberRush, USPS, UPS, FedEx. As another option, in-house services may be used as part of own fleet of vehicles for delivery. Further, automated systems like self-driving vehicles and aircraft may be used for last mile delivery. The last mile delivery process generally comes after the first miles logistics process. In an embodiment of the invention, the last mile delivery process may be different to conventional processes, as for example for small towns where air-cargo is dropped into a nearby drop zone, the last mile delivery process may be performed directly by at least one person in charge of receiving such air cargo, so that such person processes, sorts, and delivers the e-commerce merchandise without the need of external or third-party delivery processes. This will depend on the amount and weight of packages, and periodicity of air-cargo receiving at such drop zone, which for small towns it is expected to be less than for larger towns or cities. For drop zones (8) where dropping of air-cargo is done, for example, once or twice a day, the same person may achieve delivery of the packages before returning to the drop zone for collecting new air-cargo.

In an embodiment of the invention, delivery of products is performed within the same day from when the customer places the order in the online shopping platform. In another embodiment of the invention, delivery may be performed within 12 hours from when the customer places the order in the online shopping platform. In yet another embodiment of the invention, delivery is performed within 8 hours from when the customer places the order in the online shopping platform. In another embodiment of the invention, delivery is performed within 4 hours or less from when the customer places the order in the online shopping platform.

The present invention is more sustainable and allows more efficient operation than the present de-centralized logistics systems, given that vendors will not need to produce, manufacture, o supply large quantities of the same item so that they are shipped to a large number of fulfillment centers to allow for fast delivery. In the present case, the additional transportation and multiplicity of manufacturing items is avoided, providing a more sustainable and efficient system.

In an embodiment of the invention, more than one hundred orders per day are delivered through air-cargos (43) by using the method of the present invention. In another embodiment of the invention, more than one thousand orders per day are delivered through air-cargos (43). In a further embodiment of the invention, more than ten thousand orders per day are delivered through air-cargos (43).

Low Cost Logistics Efficiency Index

It important to highlight that the low capital and operation cost logistics system and method of the invention not only allows to provide fast delivery of e-commerce merchandise without the need of building, operating or using a large number of fulfillment centers or vast fulfillment center space, but also has the potential of expanding the efficiency of current de-centralized distribution center models, not only in terms of the geographical area that they can cover but also in terms of their delivery times. Current de-centralized models can achieve delivery of a small number of products in a fairly short time, due to their convenient locations closer to the consumers. However, in certain areas or regions where no local distribution centers exist, consumers may not able to receive their orders within a hours or even a 48 hours time frame. One of the advantages of the present system and method is that it can expand the capacity of currently existing distribution centers to deliver purchased merchandise within a 48 hours time frame, or even within a 24 hours time frame in a much wider geographical area.

It is also important to emphasize that that the low capital and operation cost logistics system and method of the invention has the potential of expanding the same day delivery in cities capacity of traditional de-centralized models, from e.g., 1%, such as Amazon to up to 100%. Likewise, the systems and methods of the present invention can allow same day delivery for up 100% of their stock in small towns, a feature that traditional de-centralized models such as the one used by Amazon, do not achieve. Furthermore, the system and method can provide the delivery of fresh products due to their increased capacity of achieving same day delivery in even remote areas. As the system and method of the present invention require only few Central Fulfillment Centers or fulfillment center space, it is possible with a comparative small investment, to have state of the art, very high-tech robotized storage, sorting, and packaging systems.

According to preliminary studies based on publicly available information, the low capital and operation cost logistics system and method of the invention has the potential of achieving annual profits of up to USD 22.9B versus the annual USD 7B that, based on belief and information, Amazon achieves. To this end, the system and method of the invention may require an investment including CFC's and other equipment of only USD 8B versus the USD 36B that, based on belief and information, Amazon invests or has invested.

As an example, it has been estimated that, by using the system and method from the present invention for the U.S. and considering only two central fulfillment centers required to provide fast delivery of massive amounts of e-commerce merchandise of 13 million orders per day, the capital costs associated with fulfillment centers from the present invention would be approximately US$8 Billion, compared to the estimated capital costs of the large fulfillment center structure of Amazon, of about US$34.39 billion, achieving therefore a potential capital costs reduction of more than 50 times. Further, the operational costs associated to fulfillment and shipping from this example are estimated as about US$34.68 billion per year, compared to US$67.17 billion per year from Amazon, achieving savings of about 50% in terms of yearly operation costs, considering an estimated total number of products delivered today by Amazon.

In this sense, the method of the present invention may be configured to achieve a certain "Low Cost Logistics Efficiency Index" which may allow validating the use of the logistics method from the present invention, and measuring the efficiency of the logistics system and method focused on the first miles logistics, as described below:

Low Cost Logistics Efficiency Index =

$$\frac{nP}{nCFC} \times WI_{AD} \frac{(W_{AD}-5)}{W_{AD}} \times VI_{AD} \frac{(V_{AD}-75)}{V_{AD}} xd \times nC$$

Where:
 nCFC is the total number of CFCs utilized with the low capital and operation cost logistics system, where the efficiency index increases at lower nCFC as less infrastructure is utilized;
 nP is the total number of packages delivered per day through air-drop delivery, wherein the larger the number of packages a higher efficiency index is provided;

$W_{AD}$ is the average weight of the air cargo that is delivered through air-drop delivery in kg, where the efficiency index is improved as the air-cargo weight increases.

$V_{AD}$ is the average air-drop velocity of the air-cargo in km/h, where higher average fly speeds provide for a better index as the overall delivery time of such air-cargos (43) decreases;

d is the average distance that the air cargo travels from a CFC and/or transfer airport (12) to its target drop zone;

nC is the average number of different consumers (individuals or entities) that receive the merchandise, where a larger number of different consumers provides for a better efficiency index, as more consumers are able to benefit from the first miles logistics system; and $WI_{AD}$ is a binary index relating to the average weight of the air-cargo that contains the e-commerce merchandise and that is air-dropped from aircraft as part of the system and method of the present invention, and is a binary number as calculated below:

$$WI_{AD} = \begin{matrix} 0, \text{ when } W_{AD} := 5 \text{ kg} \\ 1, \text{ when } W_{AD} > 5 \text{ kg} \end{matrix}$$

$VI_{AD}$ is an index relating to the average velocity that the air-cargo that contains the e-commerce merchandise is dropped from the aircraft during the air-drop delivery, and is a binary number as calculated below $$VI_{AD} = \begin{matrix} 0, \text{ when } V_{AD} := 75 \text{ km/h} \\ 1, \text{ when } V_{AD} > 75 \text{ km/h} \end{matrix}$$

The first miles logistics system and method from the present invention require that the Low-Cost Logistics Efficiency Index is a number greater than zero, of at least 100, and therefore the efficiency allows to validate that the first miles logistics system and method of the present invention is being used. Additionally, the index allows measuring the efficiency of the present invention's logistics system and method, where at higher the index, the efficiency and massiveness of the system and method is increased.

As an example, if system and method of the present invention is used to deliver 30 kgs in average of air-cargo weight at an average air-drop speed of 200 km/h, where such air-cargos bring merchandise from 10 different customers, and where the air-cargos (43) where sourced and packed at a Central Fulfillment Center that is 300 km in average from the target drop zones (8) where the air-cargos (43) are delivered through air-drop, and where the number of CFCs used with the system and method is 3 and the total number of packages delivered per day through air-drop is 500, then the index results in:

$W_{AD}$=30 kg $V_{AD}$=200 km/h $WI_{AD}$=1, since 30 kg>5 kg $VI_{AD}$=1, since 200 km/h>75 km/h d=300 km nC=10 nCFC=3 nP=500

First Miles Logistics Efficiency Index =

$$\frac{nP}{nCFC} \times WI_{AD} \frac{(W_{AD} - 5)}{W_{AD}} \times VI_{AD} \frac{(V_{AD} - 75)}{V_{AD}} xd \times nC$$

First Miles Logistics Efficiency Index =

$$\frac{500}{3} \times 1 \times \frac{(30-5)}{30} \times 1 \times \frac{(200-75)}{200} \times 300 \times 10$$

First Miles Logistics Efficiency Index = $166 \times 0.83 \times 0.625 \times 300 \times 10$ First Miles Logistics Efficiency Index = 258,337

Distribution Index

Another relevant index for the low capital and operation cost logistics system and method of the present invention relates to the capacity of covering large geographical areas for delivery of e-commerce merchandise in short times only using one or a few CFCs. In this sense, the Distribution Index is defined, where;

$$\text{Distribution Index} = \frac{\# \text{ Drop Zones}}{\# \text{ Origin } CFC}$$

Where:
  # Drop Zones is the total number of drop zones (8) where air-cargos (43) are delivered through air drop coming from the at least one CFC
  # Origin CFC is the number of CFCs where the air-cargos (43) delivered in the drop zones (8) were sorted and prepared, before being air-dropped into the drop zones (8).

A higher Distribution Index means that a larger number of drop zones (8), and therefore a larger geographical area is achieved for the delivery of e-commerce merchandise, and/or also having a low number of Central Fulfillment Centers where such merchandise was sorted and prepared as part of the air-cargos (43) delivered to the drop zones (8).

Optional Variation for Long Distance Deliveries

When delivery of air-cargo is required to be performed at locations that are far away from the CFCs, generally located more than 300 km from the CFCs, a first optional embodiment is used, which includes the use of transfer airports. In this case, the abovementioned system or method also include the use of transfer airports, where from such transfer airports the previously described system and methods related to air drop deliveries take place.

Based on the present invention's low number of required CFCs and the large geographic areas that the logistics system and method is able to cover to achieve fast delivery of e-commerce products, it is expected that most drop zones will be located at least 150, 300, or even at least 500 km from such CFCs. Therefore, the low capital and operation cost logistics systems and methods of the present invention through air-drop deliveries can be complemented by a previous step of transporting either the assembled air-cargos, or the e-commerce merchandise in multibox packages, or individual packages, to such transfer airports (12) using a transfer aircraft (13). The air-cargos are then loaded into the aircraft (5). If the multibox packages or individual packages sent to a transfer airport are not yet prepared as air-cargos, then such packages are prepared as air-cargos before loading into the air-drop delivery aircraft. This prior step allows to distribute the e-commerce merchandise, individual packages (42), multibox packages (41) and/or the assembled air-cargos (43) into at least one or more transfer airports (12), by landing at such transfer airport (12), from where the air-drop suitable aircraft takes-off and then proceeds to its travel route for air-dropping the air-cargos (43) into the target drop zones (8). From the transfer airport (12), the logistics system and method previously described is replicated. Aircraft utilized to transport the air-cargos (43) or the e-commerce merchandise from the at least one CFC to a transfer airport (12) may not be aircraft suitable for air drop deliveries but is preferably selected from the group comprising transfer aircraft (13) suitable for transporting air-cargo, such as jumbo jets with high weight and volume capacities. A transfer aircraft (13) aims at transporting the air-cargo or e-commerce merchandise from the at least one CFC to the transfer airport (12), if required, and where the traditional long distance cargo aircraft lands at such transfer airport (12) for distributing the air-cargo into at least one air-drop suitable aircraft as previously described, which then air drops the air-cargo in predefined drop zones (8). This transfer aircraft may also transport air cargos (43) or e-commerce merchandise from a transfer airport (12) to another, or from a CFC to another, among many other combinations. Some examples of transfer aircraft (13) may be selected from the group of aircrafts comprising Boeing 747 models, the Boeing 767 models, or the Boeing 777 models, among others. FIG. 11, depicts a part of the complete logistics of the present invention, including an embodiment with one CFC (3) from where a transfer aircraft (13) such as a jumbo jet aircraft, ships air-cargo from the CFC to a transfer airport (12) from where an air-drop delivery aircraft (5), such as a C-130 aircraft, departs in order to deliver air-cargos (43) during flight to at least one drop zone (8) within its travel route. Likewise, FIG. 12 depicts a part of the logistics of the present invention, including an embodiment with one CFC (1) from where a transfer aircraft (13) such as a jumbo jet aircraft, ships air-cargo or e-commerce merchandise from the CFC to a transfer airport (12) from where an air-drop delivery aircraft (5), such as a C-130 aircraft, departs in order to deliver an air-cargo (43) during flight to one drop zone (8) within its travel route.

This transfer aircraft (13), since it aims to distribute all of its load (air-cargos (43)) at the transfer airport (12), poses a risk of going back to the CFC empty. However, such space can be used in connection with the present invention so that vendors are able to ship their merchandise not only to the CFC directly, but also to the sorting airport that its closer to the vendor, where the return flight from the transfer aircraft is used to ship such products from the vendor to the CFC. Additionally, such shipping volume may be rented or sold to other vendors or shipping companies.

In an embodiment of the invention, the air-cargo or e-commerce merchandise that is transported to a transfer airport (12), is packed in a manner such that allows taking maximum advantage of the volume capacity of the aircraft and that at the same time allows to be re-arranged in the transfer airport (12) to maximize the volume capacity of the subsequent air-drop suitable aircraft.

Courier Industry

The courier logistics delivery industry can also be transformed by using the logistics systems and methods from the present invention, which can allow the courier packages to get directly to zones faster than the current system in which the aircraft lands in commercial airports and then the packages are delivered by secondary planes or trucks to these areas. Therefore, in another embodiment of the invention, a method and system are provided for shipping documents and merchandising, for the courier market, between two points by using aircraft that can drop-ship air-cargo without the need of landing.

No current logistics system can achieve a same day delivery in such small cities or rural areas. It is important to note that as a result of shipping and delivery logistics systems, the total cost of a package for its fulfillment and delivery in such short time will be lower than for current leading de-centralized logistics systems and methods.

Urban Deliveries and Urban Delivery Index

As an optional variation of the present invention, a disruptive low capital and operation cost logistics system and method for delivery of e-commerce merchandise to high-population density urban locations (18) or short distances is provided. In this sense, when delivering to high-population density locations where drop zones (8) as previously described are not feasible given regulatory issues, sizing issues, locations, safety concerns, or other reasons, urban delivery aircraft (5a) is used that can deliver the air-cargos (43), including individual packages (42) or multibox packages (41), to achieve delivery to a final logistic point that is closer to the consumers in such zones, previous to the last mile delivery process. It is important to note that this process of delivery to a final logistic point does not represent the last mile delivery to the consumer, as this aims to bring the packages as close to the consumer as possible from where the last mile delivery process is executed.

These urban deliveries may comprise air-dropping the air cargo, landing of the urban delivery aircraft (5a) for unloading of the cargo, or unloading of the air-cargo into a designated urban delivery area (18) while on a relatively static position during flight. Preferably, aircraft (5a) for these purposes comprises aircraft that are suitable for static aerial delivery or aircraft that can take off or land substantially vertically, in order to deliver the air-cargos in urban zones, including high population density zones, such as helicopters or vertical landing aircraft that can lower cargo loads or drop them into a designated area.

Urban delivery aircraft (5a) is selected to provide deliveries within a range of up to 100 km as an average from their take-off zone or sourcing location (17) that has the e-commerce merchandise, which may correspond to a CFC, a Transfer airport (12), a Drop Zone (8), or an outbound sorting center, depending on the location of the consumers. More preferably, the delivery range is within 50 km of the take-off zone. The urban delivery aircraft is configured to carry a total air-cargo load of at least 500 kgs in average.

Some examples of urban delivery aircraft (5a) comprise helicopters, such as the AH-64 models, the CH-47 models, the CH-53 models or the OH-58 models. Other examples or urban delivery aircraft (5a) comprises aircraft that can take-off or land in a substantially vertical manner. In this sense, the air-cargo (43) or portions thereof may be delivered to smaller designated zones to a final logistic point, such as the roof of shopping malls or commercial/office buildings, as well as using stadiums, fields, parks, green areas, among others.

Figure 13:
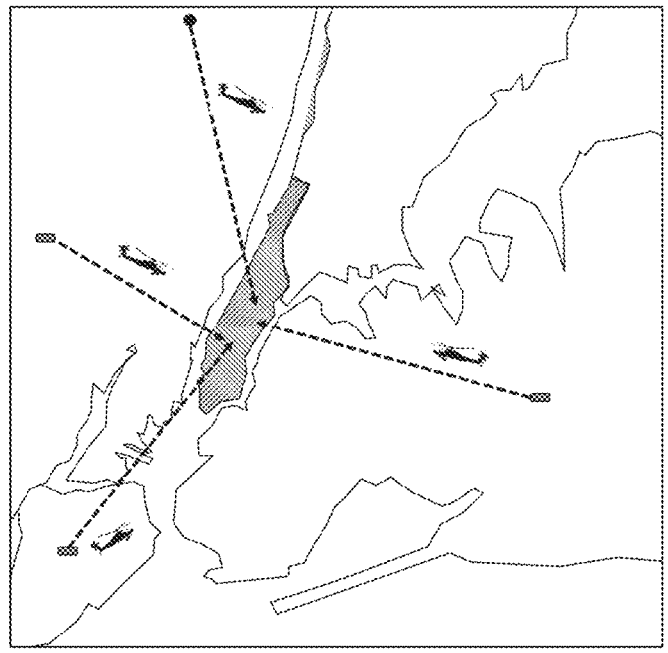
FIG. 13 shows an schematic representation of an embodiment of the present invention showing a close-up of the state of New York and the areas surrounding Manhattan, wherein the air-cargo or a portion of it is delivered in high population density or urban areas through aircraft, specifically helicopters, which allow to deliver such air cargo either by landing in small areas and/or by keeping static and descending its load into such small areas, or dropping the load into net a receiving system (91) located within such urban areas, such as building roofs or similar surfaces.
Figure 14:
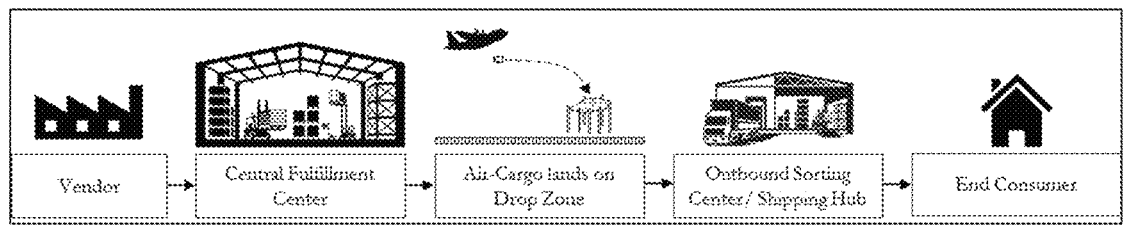
FIG. 14 shows a simplified schematic of the present invention's low capital and operation cost logistics systems for fast delivery of products to consumers, where the air-cargo is collected and sent to an outbound sorting center before the last mile delivery process of shipping to the consumer.

For example, FIG. 13 illustrates a schematic map of New York City, including Manhattan as highlighted in the Figure, showing the third optional embodiment of the invention where an urban delivery process performed in a high population density area. The urban delivery aircraft (5a) that carries at least one air-cargo is a helicopter that allows for static delivery on the roof of buildings while on flight. The helicopters can source the air cargos or portions of air-cargo from a drop zone (8), a transfer airport (12), a Central Fulfillment Center (2), or an outbound sorting center (14), among others to provide delivery to a final logistic point previous to the last mile delivery process.

It can be appreciated by the skilled in the art that the preferred use of net receiving systems (91) in urban deliveries is not only suitable, but convenient. Since helicopters or other urban delivery aircraft (5a) can keep a substantially static movement, air drop of air-cargos (43) vertically to a net receiving system (91) located in an urban area is subject to very low landing error risks, and therefore can be used to quickly deliver packages without the need of landing.

In this sense, the "urban delivery index" is created, where the urban delivery index according to the present invention measures the efficiency of the first miles logistics system and method, as described below $$\text{Urban Delivery Index} = WI_{UD} \frac{(W_{UD} - 5)}{W_{UD}} xd \times nC$$

Where:
$W_{UD}$ is the average weight of the air-cargo that is delivered to high-density urban locations in kilograms (kg)
$WI_{UD}$ is an index relating to the average weight of the air-cargo that contains the e-commerce merchandise and that delivered through aircraft (5a) as part of the system and method of the present invention, and is a binary number as calculated below:

$$WI_{UD} = \begin{matrix} 0, \text{ when } W_{UD} := 5 \text{ kg} \\ 1, \text{ when } W_{UD} > 5 \text{ kg} \end{matrix}$$

d is the average distance that the air-cargo travels from a Sourcing Location to its final logistics point
nC is the average number of different customers (individuals or entities) that receive their e-commerce merchandise through the system and method of the present invention for urban deliveries The present invention requires that the Urban Delivery Index is a number greater than zero to achieve the logistics of the system and method of the urban delivery method and system from present invention, which aim at validating that the logistics system and method for urban deliveries is being used, and also where at higher air-drop delivery index, the efficiency and massiveness of the system and method is increased.

As an example, if system and method of the present invention is used to deliver 30 kgs in average of air-cargos (43) from a helicopter that performs a static delivery over the roof of a building while flying, where such air-cargos (43) bring merchandise from 10 different customers, and where the air-cargos (43) where sourced and packed at a Central Fulfillment Center that is 30 km from the final logistic point where the packages are delivered, then the formula results in:
$W_{UD}$=300 kg
$WI_{UD}$=1, since 30 kg−5 kg=25 kg>0
d=30 km
nC=10

$$\text{Urban Delivery Index} = 1 \frac{(30-5)}{30} \times 30 \times 10$$

Urban Delivery Index = 0.3 × 30 × 10

Urban Delivery Index = 250

EXAMPLES

Example 1: Direct Delivery from CFC

To provide a prophetic example of the innovative capacity of the present invention as previously described, see the below example of a preferred embodiment of the invention, where air-drops are performed directly from a CFC:
 a. A company from California that manufactures clothing decides to sell its items of clothing through an online shopping platform.
 b. The company keeps inventory of its products (clothing items) in two Central Fulfillment Centers, one located in Salt Lake City, Utah and another one located in Nashville, Tenn.
 c. A customer from Evansville, Ind., which is a town with a population of about 100,000 people, places an order at 9:00 am ET for a t-shirt sold by the California company.
 d. An online fulfillment order is created to send information to the closest Central Fulfillment Center that has stock for such t-shirt and that is closer to the customer, in this case, the Nashville Central Fulfillment Center.
 e. By 11:00 am ET, the t-shirt has been packed into the same multibox package of other customers or orders from the same urban area, and prepared as an air-cargo and loaded into a C-130 Hercules aircraft, along other air-cargos (43) that have been loaded into such aircraft.
 f. The C-130 aircraft takes off with a planned path to deliver the air-cargos (43) to target drop zones (8), where the aircraft (5) passes over a drop zone located in the vicinity of Evansville. Such drop zone has a net receiving system (91) that is able to catch falling air-cargos (43). The aircraft drops the package carrying the purchased t-shirt, and many other packages containing other e-commerce merchandise directed to nearby end-consumer locations at the Evansville drop zone by 1:00 pm ET.
 g. The air-cargo is collected and sorted in the same drop zone, and using a rideshare delivery system (like Uber), the package containing the t-shirt is sent to the customer, who receives it by 3:00 pm ET of the same day.

Example 2: Delivery Using Transfer Airport

To provide another prophetic example of the innovative capacity of the alternative embodiment of the present invention, an example is provided, where prior to the air-drop delivery, the air-cargo is transported to a transfer airport (12):
 a. The same company from California that manufactures clothing decides to sell its items of clothing through an online shopping platform.
 b. The company keeps inventory of its clothing items in two Central Fulfillment Centers, one located in Salt Lake City, Utah and another one located in Nashville, Tenn.
 c. A customer from Vero Beach, Fla., which is a small town with a population of less than 30,000 people, places an order at 9:00 am ET for a t-shirt sold by the California company.
 d. An online fulfillment order is created to send information to the closest Central Fulfillment Center that has stock for such t-shirt and that is closer to the customer, in this case, the Nashville Central Fulfillment Center.
 e. By 11:00 am ET, the t-shirt has been packed into the same multibox package of other customers or orders from the same urban area, and loaded into a 747 jumbo jet cargo aircraft, along other orders that have been loaded into such aircraft.

f. The jumbo jet cargo aircraft transports the merchandise into a Transfer airport (12) located in Orlando, Fla., where the jumbo jet lands by 13:30 pm ET. The orders are then prepared as an air-cargo and are distributed into a C-130 Hercules aircraft, where the rest of the air-cargos (43) are distributed to pre-defined aircraft depending on their air-drop routes and target drop zones (8).

g. The C-130 aircraft takes off at about 14:00 pm ET with a planned path to deliver the air-cargos (43) to target drop zones (8), where the aircraft passes over a drop zone located in the vicinity of Vero Beach. Such drop zone has a net receiving system (91) that is able to catch falling air-cargos (43). The aircraft drops the air-cargo, where the air-cargo contains a package carrying the purchased t-shirt shirt and 150 other packages containing other e-commerce merchandise directed to nearby end-consumer locations at the Vero Beach drop zone by 2:30 pm ET.

h. The air-cargo is collected and sorted in the same drop zone, and using a rideshare delivery system (like Uber), the package containing the t-shirt is sent to the customer, who receives it by 3:00 pm ET on the same day.

Example 3: Urban Deliveries

To provide another prophetic example of the innovative capacity of the present invention, see the below example of an embodiment of the invention when used for high-population density delivery on an urban location:

a. A company from California that manufactures clothing decides to sell its items of clothing through an online shopping platform.

b. The company keeps inventory of its clothing items in one Central Fulfillment Center located in the middle of a city, specifically a high-population density such as in Manhattan, N.Y., as well as in two other CFCs in Salt Lake City, Utah and another one located in Nashville, Tenn.

c. A customer from the Upper West Side located within Manhattan, places an order at 9:00 am ET for a t-shirt.

d. An online fulfillment order is created to send information to the closest Central Fulfillment Center that has stock for such t-shirt and that is closer to the customer, in this case, the Manhattan CFC.

e. By 10:00 am ET, the t-shirt has been packed into the same multibox package of other customers or orders from the same urban area, prepared as an air-cargo, and loaded in a cargo helicopter for providing a fast urban delivery, along other air-cargos (43) for other customers in the same area.

f. The cargo helicopter then takes off from the Manhattan CFC, and statically lowers the air-cargo containing the package onto the roof of a designated building within an Upper West Side designated cargo landing zone by 11:00 am ET.

g. The air-cargo is collected and sorted in an office within the same building, and using a rideshare delivery system, the package containing the t-shirt is sent to the customer, who receives it by 12:00 pm ET on the same day.

Example 4: Air-Drop

An airdrop exercise was conducted in order to assess, among other elements, the dispersion pattern and the landing parameters of the landing air-cargos (43) according to an embodiment of the present invention. The exercise was conducted in Arizona, U.S., using a Short SC.7 Skyvan a twin-turboprop aircraft having a maximum takeoff weight of about 5,670 kg, a maximum speed of about 175 knots and a cruise speed of about 150 knots.

Figure 19:
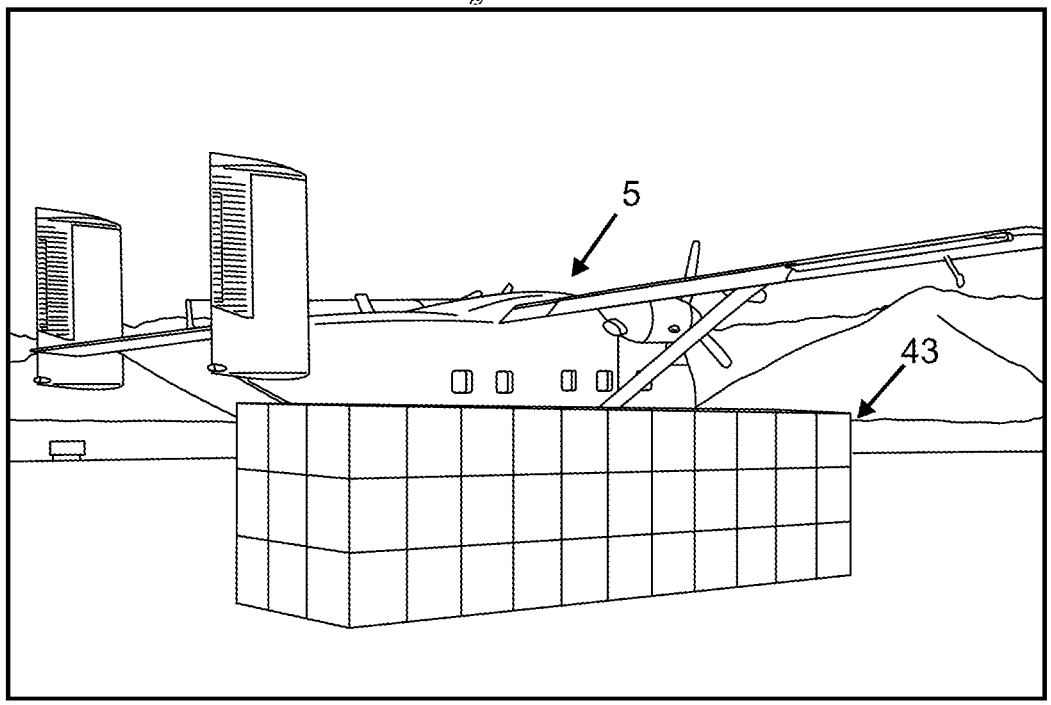
FIG. 19 shows an exemplary embodiment of the invention, including a set of air-cargos (43) prior to loading into an aircraft (5).
Figure 20:
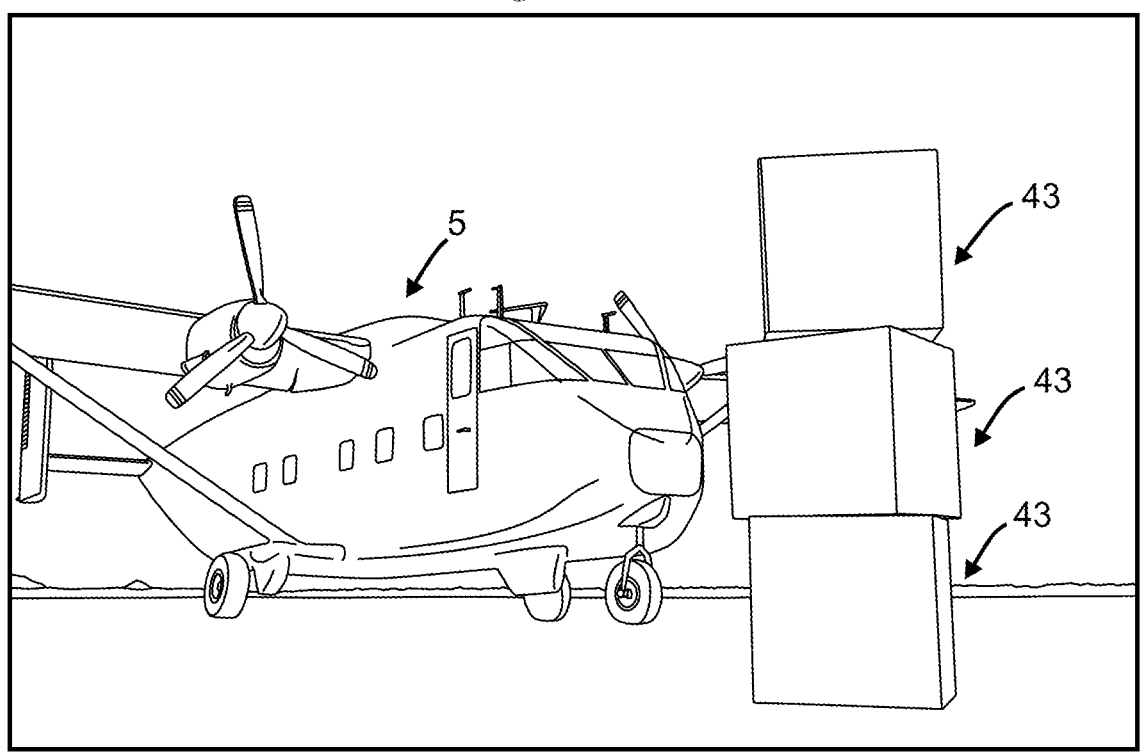
FIG. 20 shows an exemplary embodiment of the invention, including a set of air-cargos (43) prior to loading into an aircraft (5).
Figure 21:
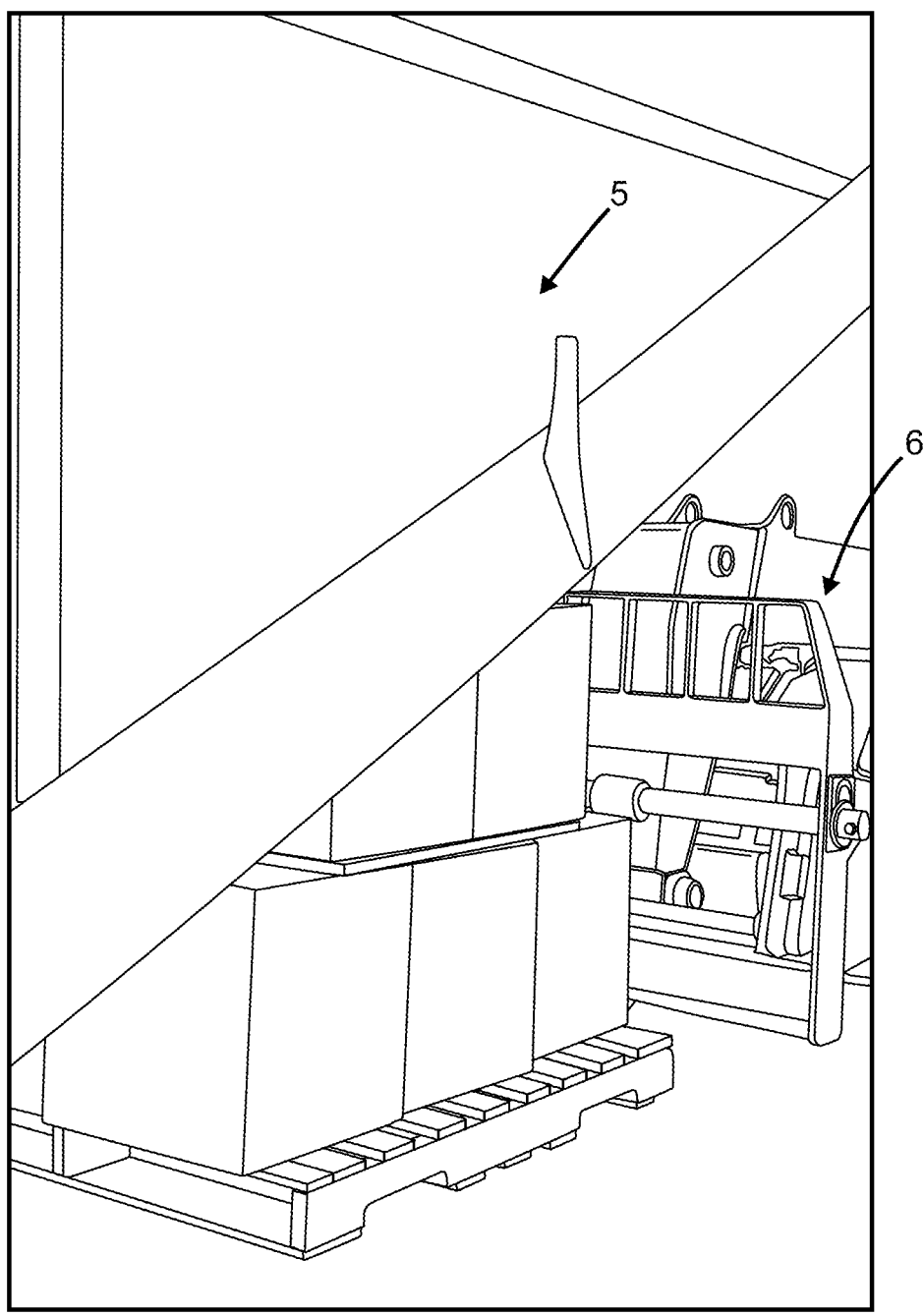
FIG. 21 shows an exemplary embodiment of the invention, where a set of air-cargos (43) being loaded into the aircraft (5) with the assistance of a loading system (6).
Figure 22:
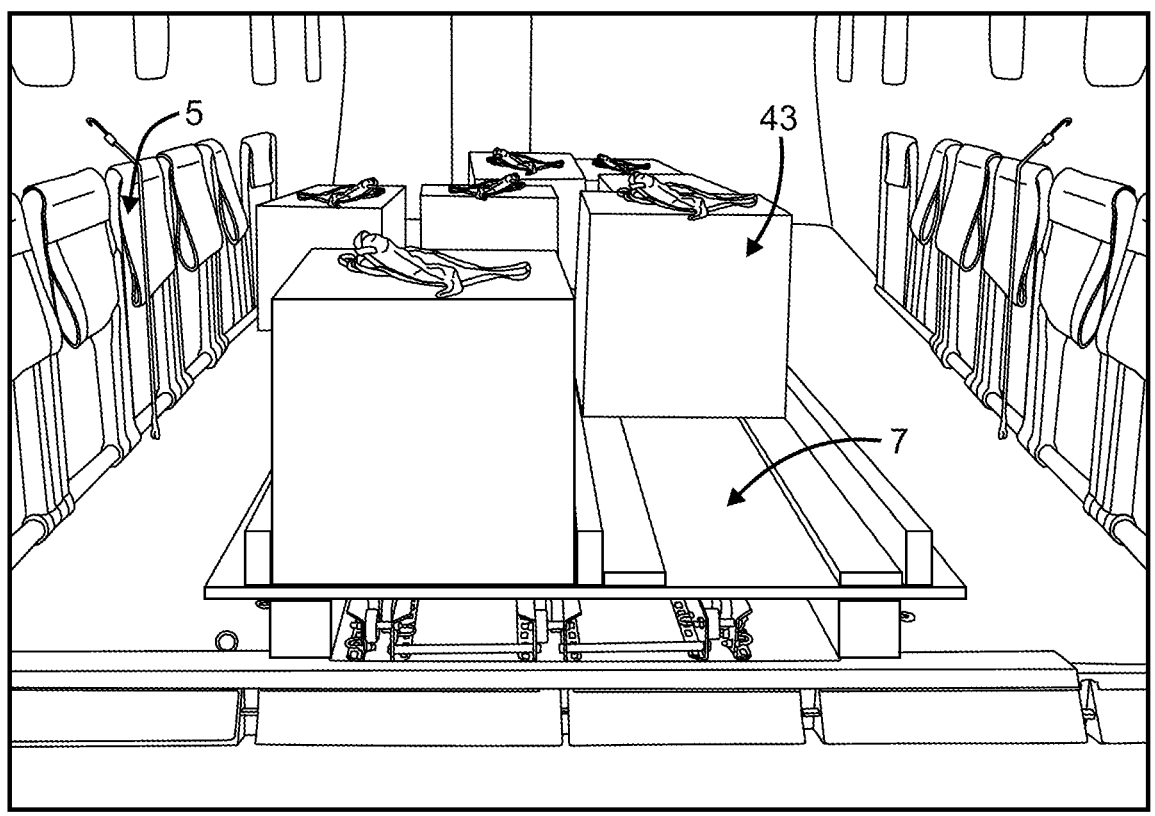
FIG. 22 shows an exemplary embodiment of the invention, where a set of air-cargos (43) are loaded into the aircraft (5) prior to take-off.
Figure 23:
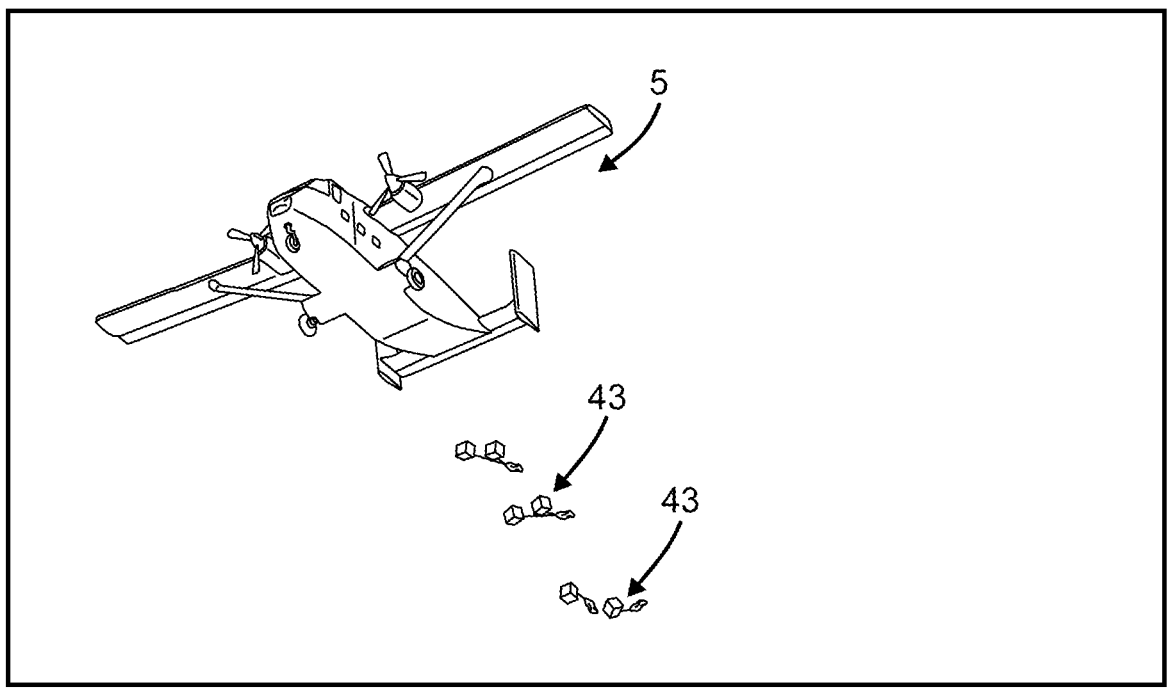
FIG. 23 shows an exemplary embodiment of the invention, where a set of air-cargos (43) are air-dropped from the aircraft (5).

As seen in FIG. 19 and FIG. 20, a group of about 90 air-cargos (43) were assembled, each carrying a weight of about 27 kg (60 pounds). A loading system (6) loaded the air-cargos (43) into the aircraft in groups of about 20 air-cargos (43) per delivery, as seen in FIG. 21. Drop coordinates were provided to the aircraft, which included GPS latitude and longitude coordinates of the determined drop zone (8). The aircraft was provided with an ejection system (7) that, upon receiving instructions from the aircraft, executed the airdrop release in sets of one, two, four or six air-cargos (43) as per FIG. 22 and FIG. 23. Ten airdrop deliveries were conducted and a number of parameters were recorded, including air drop altitude, landing speed and landing distance to a reference point within the target drop zone (8); where an exemplary air drop is depicted as per FIG. 23. These data were collected in order to assess a suitable airdrop area and preferably, to define or configure a net receiving system (91) that is able to receive the air-cargos (43).

The following Table 1 summarizes the landing pattern the air-drops:

TABLE 1

| Release N. | Airdrop altitude* | Landing speed | Air-cargo average landing distance to the reference point | Landing distance standard deviation |
| --- | --- | --- | --- | --- |
| 1 | 152 m (500 ft.) | 154 km/h | 19.9 m | 10.1 |
| 2 | 304.8 m (1,000 ft.) | 171 km/h | 27.5 m | 19.3 |
| 3 | 304.8 m (1,000 ft.) | 171 km/h | 39.3 m | 31.1 |
| 4 | 762 m (2,500 ft.) | 182 km/h | 20.5 m | 14.0 |

*referential altitude, with a +/− 10% deviation

Table 1 shows the air-cargo average landing distance from the reference point for four airdrop altitudes as well as the standard deviation for each of them, which serves as a predictor of the landing deviation pattern for the specific type of air-cargos, weather conditions, and other variables from such air-drop exercise. The data on landing distance as well as the standard deviation allow predicting that for this type of airdrop, a landing assisting system (9) and preferably a net receiving system (91) should be provided with a surface design to cover such deviation patterns.

As thoroughly described, the present invention discloses completely innovative low capital and operation cost logistics systems and methods that allow the fast and massive delivery of e-commerce merchandise of millions of items and packages, in extensive geographical areas such as whole states, whole countries and continents, allowing to avoid the need of building and operating multiple fulfillment warehouses (that have high capital and operation costs) near the consumers, creating a revolution in the e-commerce industry worldwide.

The well-known inventor of the present logistic system and method has been recognized worldwide as entrepreneur of the year, innovator of the year, and businessman of the year, having received numerous awards from all over the world, and Intellectual Property valued in more than 3 billion USD, including more than 2,000 patents in more than 190 countries worldwide.

It is also important to mention that, even though the present invention overcomes the high costs associated with having to build and maintain a large number of fulfillment centers to provide fast delivery, current e-commerce or fulfillment companies may benefit from the system and method of the present invention to provide shipping to drop zones (8) from already built fulfillment centers, speeding their delivery.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A low capital and operation cost e-commerce first mile logistics system comprising the use of multibox packages, sorting at the origin, and air cargos that are air-dropped, and that allows for the fast and massive delivery of e-commerce merchandise in an extensive geographical area, reducing the need for building, operating, or using a large number of fulfillment centers located near the consumers as in traditional e-commerce de-centralized logistics, the system comprising:

at least one Central Fulfillment Center (CFC) (2) that allows replacing at least a 20% of the total fulfillment center space used in a traditional de-centralized logistics model, the CFC (2) having a storage area of at least about 5,000 m$^2$ and a height of at least two meters between a floor and a top-most roof of the CFC (2), and configured to store at least 10,000 items of e-commerce merchandise, wherein the CFC (2) is located at a distance of not more than 50 km from a runway facility for at least one of take-off or landing of a manned aircraft;

a computing system configured to receive fulfillment information (23) of at least 1,000 orders per day placed from at least one of an online shopping platform or a consumer (22); where the computing system is in network connection or in communication with the at least one CFC (2), in order to receive the fulfillment information (23) of the placed orders;

a sorting system that selects the merchandise stored in the at least one CFC (2) and, based on the fulfillment information (23), prepares at least one multibox package (41) that contains the selected merchandise wherein the merchandise is sorted by the sorting system at the origin CFC to prepare at least one multibox package that houses such merchandise based on the final destination zone (such as a block, neighborhood, small town, small city, and even a same building, among others);

at least one multibox package (41) that contains products from more than one order or consumer, where such products or orders are destined to a same predefined final destination zone, and wherein the multibox are then configured or prepared as part of at least one air-cargo (43), which is air-dropped by at least one aircraft (5) that is capable of carrying a total air-cargo load of at least 2,000 kgs in average and capable of flying at a speed of at least 200 km/h;

at least one air-cargo ejection system (7) located within the aircraft (5), that selectively drops the at least one air-cargo (43) from the aircraft (5) at an altitude of between 5 m and 20,000 m while the aircraft is flying, wherein the air-cargo (43) lands within at least one drop zone (8);

at least one drop zone (8) located at a distance of at least 150 kilometers from the at least one CFC (2), wherein the drop zone (8) is configured to receive the at least one air-cargo (43) dropped from the air-drop delivery aircraft (5);

at least one landing assisting system (9) configured to reduce the landing speed of the air-cargo and/or providing a softer landing of the at least one air-cargo (43), wherein the landing assisting system (9) comprises a net receiving system (91) with a surface of at least about 200 m2 and an air-cargo receiving capacity of at least 10 air-cargos per hour, and wherein the net receiving system comprises at least one impact assist system that includes at least one of a force dissipation device or a deceleration system;

at least one delivery system arranged to deliver the e-commerce merchandise to consumers from the drop zone (8), wherein the e-commerce merchandise can optionally go through an outbound sorting center (14) before being delivered to the consumer; and wherein the low capital and operation cost e-commerce first mile logistics system is arranged and configured to sort and transport e-commerce merchandise from its storage location to a final logistic point that is close to the consumer, and whereby the last mile delivery process may be undertaken by other systems.

2. Logistics system according to claim 1, further comprising a loading system (6) for loading the air-cargo (43) into at the least one aircraft (5) in a specific order based on the air-drop delivery projected path and travel information.

3. Logistics system according to claim 2, wherein the loading system (6) comprises a device to read a label attached to the air-cargo (43), to send a signal to the computing system with a label information and to process an instruction from the computing system that, based on the fulfillment information, determines the position of the air-cargo (43) within the aircraft.

4. Logistics system according to claim 2, wherein the loading system (6) comprises manual loading and/or conveying devices for conveying the air-cargo (43) onto a loading deck of the aircraft (5).

5. Logistics system according to claim 1, wherein the sorting system (6) comprises picking machinery, automated robots, or manual picking.

6. Logistics system according to claim 1, further comprising at least one air-cargo retrieval system for the retrieval of the at least one air-cargo (43) that lands on the at least one drop zone (8) or on the landing assisting system (9), and wherein the air-cargo retrieval system is selected from the group comprising mechanic manipulator arms, vacuum lifters, mobile lifters, cranes, fork lifts and combinations thereof.

7. Logistics system according to claim 1, wherein the outbound sorting center (14) is configured to receive the air-cargo, and the merchandise (22) contained in the air-cargo (43) is sorted and classified before delivery to the consumer, and wherein the outbound sorting center (14) can utilize a last mile delivery system.

8. Logistics system according to claim 7, wherein the last mile delivery system is selected from the group comprising package carriers, traditional mail, manned vehicles, transport services, drones, autonomous vehicles, ride share services, in house services and combinations thereof.

9. Logistics system according to claim 1 wherein the at least one air-cargo (43) further comprises at least one of an individual package a container, a pallet, a platform that carries at least one package containing e-commerce merchandise, or combinations thereof.

10. Logistics system according to claim 1, wherein the at least one multibox package (41) denotes a box or package formed by one or more pieces or panels of a material selected from cardboard, paperboard, plastic or other suitable material.

11. Logistics system according to claim 1, wherein the at least one multibox package (41) comprises e-commerce merchandise from an online order using only its primary packaging, whereby a multibox package (41) is used to transport the e-commerce merchandise without an individual package or additional protection for the merchandise within the same or different orders.

12. Logistics system according to claim 1, wherein the at least one multibox package (41) contains e-commerce merchandise that has at least two different final delivery addresses, and more preferably at least ten different final delivery addresses.

13. Logistics system according to claim 1, wherein the at least one multibox package (41) or individual package are configured to be stackable.

14. Logistics system according to claim 1, wherein the at least one landing assisting system (9) further comprises a landing surface cushion system, a speed reduction system, a shock absorption system, an air-cargo protection system and combinations thereof.

15. Logistics system according to claim 14, wherein the net receiving system (91) is positioned within the drop zone (8), is configured to receive the landing air-cargo (43) and further comprises at least one of a flexible net, a flexible sheet, a poles system, or combinations thereof.

16. Logistics system according to claim 15, wherein the flexible net or flexible sheet material is held by the poles system positioned within the drop zone.

17. Logistics system according to claim 15, wherein the flexible net is a fabric, textile, or material that is looped, attached, knitted, twisted, or knotted so that it creates intersections and therefore creates a breathable mesh pattern.

18. Logistics system according to claim 15, wherein the flexible net comprises at least one material selected from the group comprising fibers like silk, polyester, or nylon, or materials like fabrics, ropes, yarn, elastane, or plastics.

19. Logistics system according to claim 15, wherein the flexible sheet comprises at least one material selected from the group comprising plastics, rubbers, fabrics, paper, among others.

20. Logistics system according to claim 15, wherein the flexible sheet is a non-reticulated material.

21. Logistics system according to claim 1, wherein the impact assist system is used in connection with the net receiving system (91), and is further selected from the group comprising height regulation systems that allow to adjust the height of the poles system, flexible net or flexible sheet depending on the velocity and weight of the impact, anchoring points, pulley systems, affixing systems, and combinations thereof.

22. Logistics system according to claim 1, wherein the net receiving system (91) has a receiving surface of at least 1,000 m2, or at least 10,000 m2 or at least 40,000 m2.

23. Logistics system according to claim 1, wherein the net receiving system (91) has an air-cargo receiving capacity of at least 100 packages per hour, and most preferable at least 200 packages per hour.

24. Logistics system according to claim 14, wherein the landing surface cushion system is positioned within the drop zone (8), is configured to receive the landing air-cargo (43) and comprises materials selected from the group comprising rubber materials, plastic materials, cardboard or paper materials and configurations, bubble wraps or air pillows, pellet materials, polystyrene, foam materials and structures, fiberboard materials, inflated products, suspension cushions, rubberized fiber materials, cork materials, and combinations thereof.

25. Logistics system according to claim 14, wherein the speed reduction system is affixed to the air-cargo (43) and is selected from the group comprising a balloon system, a parachute system, an unmanned drone system and others systems.

26. Logistics system according to claim 14, wherein the shock-absorption system is affixed to the air-cargo (43) and comprises light materials, inflatable systems or mixtures thereof and may comprise systems selected from double-wall and double-bottom systems that can be hollow or that additionally can be filled with air or shock-absorption materials such as fabric, wool, cotton, cardboard, crushable fillings, fluids, soft pellets and materials, among others, thereby allowing absorbing at least part of the shock force that the air-cargo is subject to when it lands on the drop zone (8).

27. Logistics system according to claim 14, wherein the air-cargo protection system is affixed to the air-cargo the air-cargo (43) and comprises materials attached to at least part of the outer surfaces of the air-cargo (43), selected from the group comprising rubber materials, plastic materials, cardboard or paper materials, bubble wraps or air pillows, pellet materials, polystyrene, foam materials and structures, fiberboard materials, inflated products, suspension cushions, rubberized fiber materials, cork materials, among others.

28. Logistics system according to claim 1, wherein the system further comprises a path guidance system selected from the group comprising a guide system, a steering system, and combinations thereof.

29. Logistics system according to claim 28, wherein the guide system comprises systems affixed to the aircraft (5), selected from the group comprising pulley systems, cable systems, tube systems, and combinations thereof, whereby guidance to the at least one air cargo (43) is provided so they fall within a specific area or range, or to decrease the dispersion of falling air-cargo (43).

30. Logistics system according to claim 28, wherein the steering system is affixed to the air-cargo (43) and is selected from the group comprising equipment that produces thrust, equipment that rotates, equipment that comprises fins, equipment that directs the air-cargo (43) to a specified drop location and combinations thereof, whereby deviations from a main falling path are minimized, the course of the air dropped air-cargo is adjusted, or the air dropped air-cargo is navigated so that it falls within the drop zone (8).

31. Logistics system according to claim 1, wherein the air-cargo (43) comprises an exterior that is impervious to at least one of rain, snow, condensation, or water landing conditions.

32. Logistics system according to claim 1, wherein the air-cargo (43) comprises temperature-controlled enclosures or systems.

33. Logistics system according to claim 1, wherein the at least one drop zone (8) is located within or near urban or rural areas, wherein rural areas are defined as to geographic areas that are located outside urban areas and wherein urban areas are geographical areas having high population densities, and built infrastructure.

34. Logistics system according to claim 1, wherein the at least one drop zone (8) is located near consumers, on average not more than 30 kilometers from consumers, and preferably not more than 100 kilometers on average from consumers.

35. Logistics system according to claim 1, wherein the at least one drop zone (8) is selected from the group comprising farms, green areas, underutilized land, vacant areas, aerodromes, aerodromes for light aircraft, and land extensions temporarily or permanently authorized for air-cargo landing.

36. Logistics system according to claim 1, wherein the at least one drop zone (8) is located over water, like lakes, lagoons, rivers, the sea, urban areas such as stadiums, arenas, rooftop surfaces, parks, racing fields, sport venues.

37. Logistics system according to claim 1, wherein the air-cargo (43) includes at least one flotation affixing means to affix a flotation system.

38. Logistics system according to claim 1, wherein the air-cargo (43) has a weight of at least about 5 kgs in average, preferably at least about 50 kgs in average and more preferably at least about 100 kgs in average.

39. Logistics system according to claim 1, wherein the air-cargo (43) is capable of carrying, on average, packages and/or orders of at least ten different customers with different final delivery addresses.

40. Logistics system according to claim 1, wherein the aircraft (5) is configured to carry a plurality of air-cargos (43) and to drop individual air cargo (43) consecutively and selectively based on the aircraft (5) route and the target drop zones (8).

41. Logistics system according to claim 1, wherein the Central Fulfillment Center (2) comprises an airport.

42. Logistics system according to claim 1, wherein the fulfillment information includes the current inventory of the e-commerce merchandise that has been ordered through the online shopping platform, a location of the merchandise within the Central Fulfillment Center, and a consumer delivery information.

43. Logistics system according to claim 1, wherein the extensive geographical area is at least 400 ha, preferably 1,600 ha, more preferably 3,600 ha, and most preferably 10,000 ha.

44. Logistics system according to claim 1, wherein a capital and operational cost associated to a delivery of an item of e-commerce merchandise is up to five times less than for leading de-centralized models that use a high number of fulfillment centers.

45. Logistics system according to claim 1, wherein the e-commerce merchandise is selected from the group comprising entertainment products, electronics, clothing, accessories, home products, tools, fresh products, niche products, sporting goods, outdoor products, automotive equipment, products and accessories, industrial equipment and products, documents, printed material, among many others.

46. Logistics system according to claim 1, wherein the computing system is capable of receiving a high volume of online fulfillment orders, of at least 10,000, or of at least 100,000 orders per day.

47. Logistics system according to claim 1, wherein the computing system comprises at least one of the following software of the type of ERP (Enterprise resource planning) software, OMS (Order management system) software for order entry and processing, WMS (Warehouse management systems) software for optimizing warehouse functionality and distribution center management, TMS (Transport management systems) software for managing planning of transport schemes, execution and follow-up, supply chain management software, or fulfillment/enabling systems and intelligence clouds.

48. Logistics system according to claim 1, wherein the consumer (22) is selected from the group comprising a person, a software, a business, a company, and an entity.

49. Logistics system according to claim 1, wherein the consumer (22) is a business, whereby a Business-to-Business transaction is conducted.

50. Logistics system according to claim 1, wherein at least 20%, or 50%, or 90% less fulfillment centers or fulfillment center space than leading de-centralized model companies are required to achieve a short delivery of e-commerce merchandise.

51. Logistics system according to claim 1, wherein the Central Fulfillment Center is configured to store at least 100,000; preferably at least 1,000,000 items of e-commerce merchandise in inventory.

52. Logistics system according to claim 1, further comprising at least one transfer aircraft (13) to distribute at least one of the e-commerce merchandise, individual package, multibox package (41), or air-cargo (43) from the CFC (2) to a transfer airport (12), provided that the distance from the at drop zone (8) to the CFC (2) is at least 300 km, so that the aircraft (5) takes off from the transfer airport (12), and air-drops air-cargo (43).

53. Logistics system according to claim 1, wherein the at least one aircraft (5) is selected from the group comprising a turboprop, helicopters, airships, jet aircraft, and propeller aircraft.

* * * * *